(12) United States Patent
Morihara et al.

(10) Patent No.: US 10,016,866 B2
(45) Date of Patent: Jul. 10, 2018

(54) ADJUSTABLE PART HOLDING FIXTURE, SYSTEM AND METHOD

(71) Applicant: The Boeing Company, Chicago, IL (US)

(72) Inventors: Richard H. Morihara, Bellevue, WA (US); Sid Venkatesh, Renton, WA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 14/718,048

(22) Filed: May 20, 2015

(65) Prior Publication Data
US 2016/0339551 A1 Nov. 24, 2016

(51) Int. Cl.
| | |
|---|---|
| *B23Q 3/08* | (2006.01) |
| *B25B 11/00* | (2006.01) |
| *B64F 5/10* | (2017.01) |
| *B64F 5/00* | (2017.01) |

(52) U.S. Cl.
CPC .............. *B23Q 3/086* (2013.01); *B23Q 3/088* (2013.01); *B64F 5/10* (2017.01); *B23Q 2703/04* (2013.01); *B25B 11/00* (2013.01); *Y10S 901/50* (2013.01); *Y10T 29/49998* (2015.01)

(58) Field of Classification Search
CPC . B23C 2240/00; B23C 2270/08; B23Q 3/086; B23Q 3/088; B23Q 2703/02; B23Q 2703/04; B25B 11/00; B25B 11/002; B25B 11/005–11/007; B64F 5/10; B23P 2700/01; Y10T 29/49622; Y10T 29/49998; Y10T 29/53961; Y10T 29/53974; Y10T 29/53991
See application file for complete search history.

(56) References Cited

U.S. PATENT DOCUMENTS

| | | | |
|---|---|---|---|
| 3,138,226 A * | 6/1964 | Howe | B23Q 3/086 269/7 |
| 4,527,783 A | 7/1985 | Collora et al. | |
| 6,418,602 B2 | 7/2002 | Crocker et al. | |
| 6,625,866 B2 | 9/2003 | Stone et al. | |

(Continued)

OTHER PUBLICATIONS

CS Alloys Tru 281; CS Alloys; accessed Aug. 16, 2017; http://www.csalloys.com/products-cerrotu-alloy.html.*

(Continued)

*Primary Examiner* — Matthew P Travers

(57) ABSTRACT

There is provided an adjustable part holding fixture, system and method. The fixture has a base assembly with a container and a phase change material contained within the container. The fixture has a control device to convert the phase change material between a non-rigid state and a rigid state. The fixture has a plurality of part holding assemblies, each having a base anchoring portion for insertion into and positioning in the phase change material, and a part attachment portion configured to releasably attach to a surface of a part being held by the fixture. The phase change material in the non-rigid state allows for positioning of the base anchoring portion and adjusting to the part being held, and the phase change material in the rigid state holds the base anchoring portion in a desired position and holds the part in place during one or more processes performed on the part.

19 Claims, 10 Drawing Sheets

(56) References Cited

U.S. PATENT DOCUMENTS

2002/0003352 A1* 1/2002 Portal .................. B23Q 1/5462
279/3
2007/0020065 A1* 1/2007 Kirby .................... B23Q 1/035
414/1

OTHER PUBLICATIONS

CNA Flexible Tooling web pages downloaded on May 20, 2015, from Internet website at web address: <http://www.cnaflextool.com/cnaflextool/default.htm>, 3 pages.

Flow Aerospace web pages downloaded on May 20, 2015, from Internet website at web address: <http://aipaerospace.com/flowaerohome>, 2 pages.

HGS Aerospace web page downloaded on May 20, 2015, from Internet website at web address: <http://www.hgsaero.com/02automation.html>, 1 page.

MTorres web pages downloaded on May 20, 2015, from Internet website at web address: <http://www.mtorres.es/en/aeronautics/products/carbon-fiber/torrestool>, 3 pages.

Horst-Witte web pages downloaded on May 20, 2015, from Internet website at web address: <https://www.horst-witte.com/products/modular-fixturing-systems/fixtures-jigs.php>, 2 pages.

Empire Robotics web pages downloaded on May 20, 2015, from Internet website at web address: <http://empirerobotics.com/>, 9 pages.

IceVice web pages downloaded on May 20, 2015, from Internet website at web address: <http://www.ibagna.com/pdfs/FreezeChuck.pdf>, 9 pages.

Lord Corp. web pages downloaded on May 20, 2015, from Internet website at web address: <http://www.lord.com/products-and-solutions/active-vibration-control/industrial-suspension-systems/magneto-rheological-(mr)-fluid>, 4 pages.

* cited by examiner

ADJUSTABLE PART HOLDING FIXTURE, SYSTEM AND METHOD

BACKGROUND

1) Field of the Disclosure

The disclosure relates generally to fixtures, systems and methods for holding structures during manufacturing operations, and more particularly, to improved fixtures, systems and methods using a phase changing material to hold parts, such as workpieces, during manufacturing operations.

2) Description of Related Art

In the manufacture of component parts and structures for aircraft, spacecraft, rotorcraft, watercraft, or other vehicles or structures, fixtures are often utilized to hold or support parts or workpieces during manufacturing processes or operations performed on the parts or workpieces. Such manufacturing processes or operations may include, for example, machining, milling, cutting, drilling, trimming, shaping, and other manufacturing processes or operations. Typically, either solid fixtures or flexible fixtures may be used to hold or support parts or workpieces during such manufacturing processes or operations.

Solid fixtures consisting of a non-reconfigurable material shaped to fit a nominal part and designed to hold the part via vacuum or clamping devices are known. However, such solid fixtures do not account for part variation, and parts may need to be manipulated and flexed to fit into a solid fixture. Each different part class may require its own solid fixture. This may result in increased manufacturing, maintenance, and storage costs for such solid fixtures. Moreover, lift assist equipment may be required if the solid fixture is heavy or bulky, and such lift assist equipment may be expensive to use and set up. Further, changing the solid fixture for each different part class may require increased time and effort, which, in turn, may result in overall increased manufacturing costs.

Flexible fixtures consisting of multiple independent actuators that can be adjusted to fit the shape of the part being held and that require a sophisticated controller to drive such actuators to programmed positions are known. However, such flexible fixtures may be expensive, complex, have decreased reliability, and may be physically large in size, thus requiring increased area or floor space. In addition, flexible fixture systems that can be reconfigured may require a large number of motorized actuators, controlling mechanisms, and electronics associated with each independent actuator. This may result in increased costs and complexity and decreased reliability.

Another known fixturing system includes the use of a material or device that freezes or cures around a workpiece or part, for example, freeze chucks, to hold or support the part or workpiece. However, although freeze chucks are adaptable to different part shapes, they may only be feasible for use with small parts and not for use with large parts. For example, the time required to freeze the holding material may be, for example, 90 (ninety) seconds for small parts, but may significantly increase with the amount of holding material that needs to be frozen for larger parts. This may result in increased manufacturing time.

Accordingly, there is a need in the art for an improved adjustable part holding fixture, system and method that is simple to install, use and service, compact in size, low cost, and reliable, and that provide advantages over known fixtures, systems and methods.

SUMMARY

Example implementations of this disclosure provide an improved adjustable part holding fixture, system and method. As discussed in the below detailed description, embodiments of the improved adjustable part holding fixture, system and method may provide significant advantages over known fixtures, systems and methods.

In one embodiment there is provided an adjustable part holding fixture. The adjustable part holding fixture comprises a base assembly. The base assembly comprises a container and a phase change material contained within the container. The adjustable part holding fixture further comprises a control device coupled to the phase change material and configured to convert the phase change material between a non-rigid state and a rigid state.

The adjustable part holding fixture further comprises a plurality of part holding assemblies. Each part holding assembly comprises a base anchoring portion coupled to a part attachment portion. The base anchoring portion is configured for insertion into and positioning in the phase change material. The part attachment portion is configured to releasably attach to a surface of the part being held by the adjustable part holding fixture.

The phase change material in the non-rigid state allows for positioning of the base anchoring portion and adjusting to the part being held. The phase change material in the rigid state holds the base anchoring portion in a desired position and holds the part in place during the one or more processes performed on the part.

In another embodiment there is provided an adjustable part holding system. The adjustable part holding system comprises a machining assembly comprising at least a work surface and a machine tool. The machine tool is coupled to a control and power system configured for controlling and powering the machine tool.

The adjustable part holding system further comprises a portable, adjustable part holding fixture installed in the machining assembly. The adjustable part holding fixture comprises a base assembly comprising a container and a phase change material contained within the container. The adjustable part holding fixture further comprises a control device coupled to the phase change material and configured to convert the phase change material between a non-rigid state and a rigid state.

The adjustable part holding fixture further comprises a plurality of part holding assemblies. Each part holding assembly comprises a base anchoring portion coupled to a part attachment portion. The base anchoring portion is configured for insertion into and positioning in the phase change material. The part attachment portion is configured to releasably attach to a surface of the part being held by the adjustable part holding fixture.

The phase change material in the non-rigid state allows for positioning of the base anchoring portion and adjusting to the part being held. The phase change material in the rigid state holds the base anchoring portion in a desired position and holds the part in place during the one or more manufacturing processes performed on the part.

In another embodiment there is provided an adjustable part holding method for holding a part during one or more manufacturing processes performed on the part. The adjustable part holding method comprises the step of assembling an adjustable part holding fixture. The adjustable part holding fixture comprises a base assembly having a container of a phase change material, a control device coupled to the phase change material, and a plurality of part holding assemblies. Each part holding assembly comprises a base anchoring portion coupled to a part attachment portion.

The adjustable part holding method further comprises the step of installing the adjustable part holding fixture in a machining assembly. The machining assembly comprises at least a work surface and a machine tool coupled to a control and power system.

The adjustable part holding method further comprises the step of inserting into the phase change material, the base anchoring portion of one or more of the part holding assemblies, when the phase change material is in a non-rigid state. The adjustable part holding method further comprises the step of attaching the part attachment portion of one or more of the part holding assemblies to a surface of the part.

The adjustable part holding method further comprises the step of positioning each base anchoring portion in the phase change material, and adjusting each base anchoring portion to the part being held, until a desired position of each base anchoring portion is obtained. The adjustable part holding method further comprises the step of using the control device to convert the phase change material from the non-rigid state to a rigid state, to hold the base anchoring portion in the desired position and to hold the part in place. The adjustable part holding method further comprises the step of using the machining assembly to perform one or more manufacturing processes on the part being held by the adjustable part holding fixture.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1A:
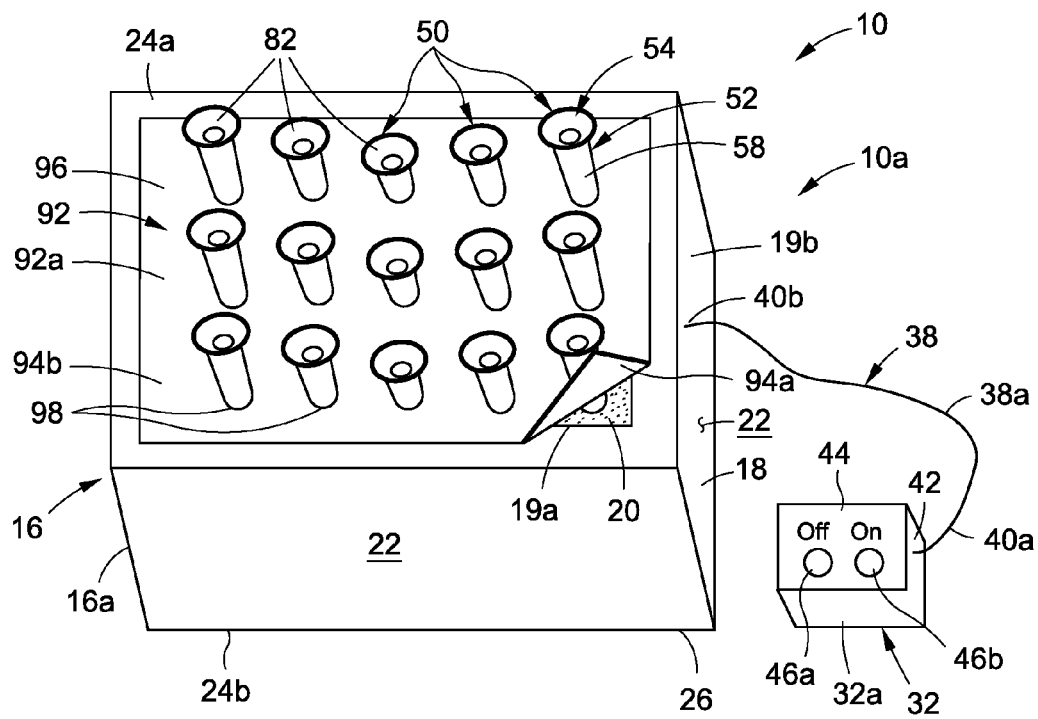
FIG. 1A is a schematic diagram of a top perspective view of an embodiment of an adjustable part holding fixture of the disclosure.
Figure 2A:
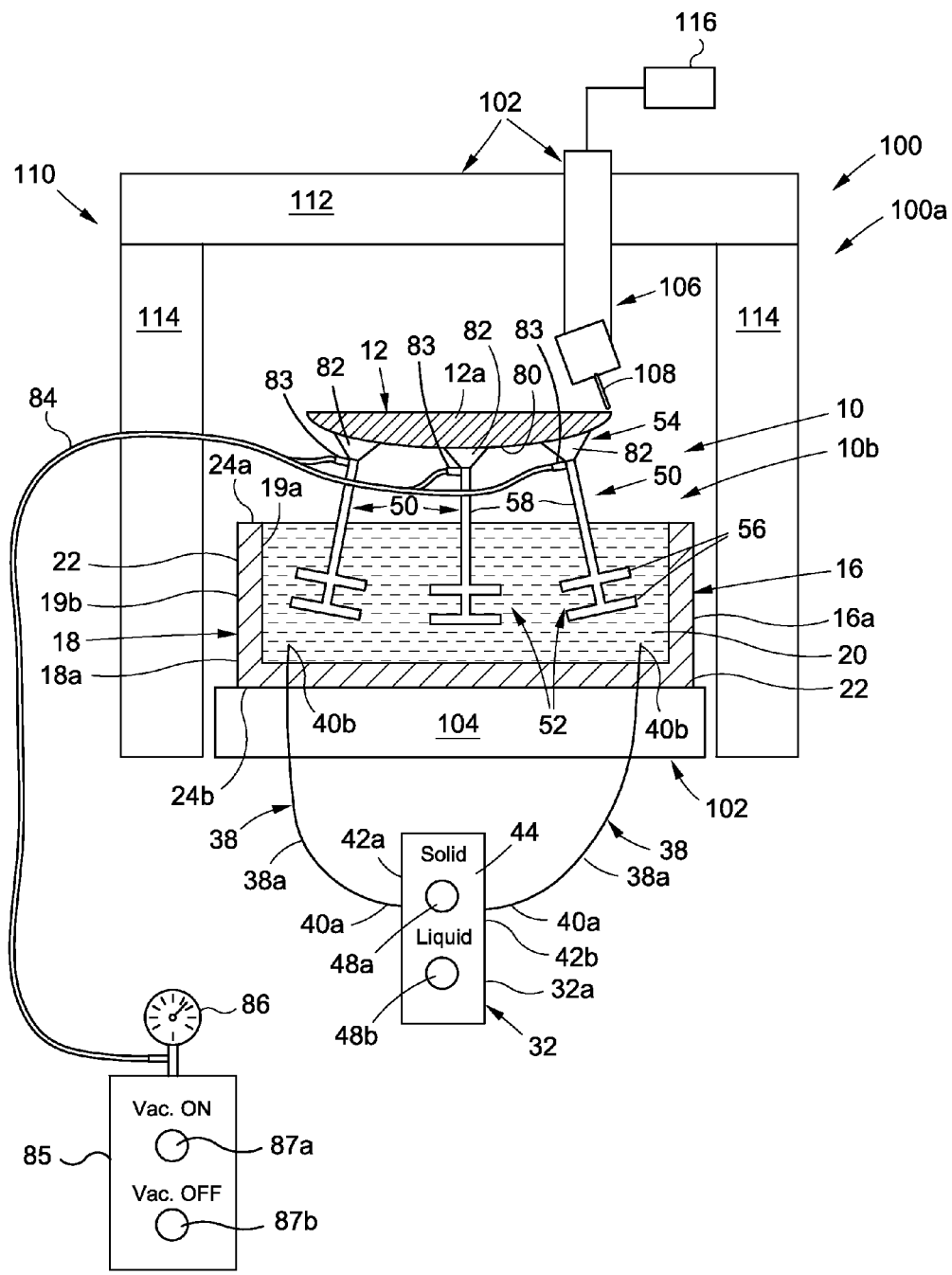
FIG. 2A is a schematic diagram of a partial cross-sectional front view of an embodiment of an adjustable part holding system of the disclosure with an embodiment of an adjustable part holding fixture of the disclosure.
Figure 3A:
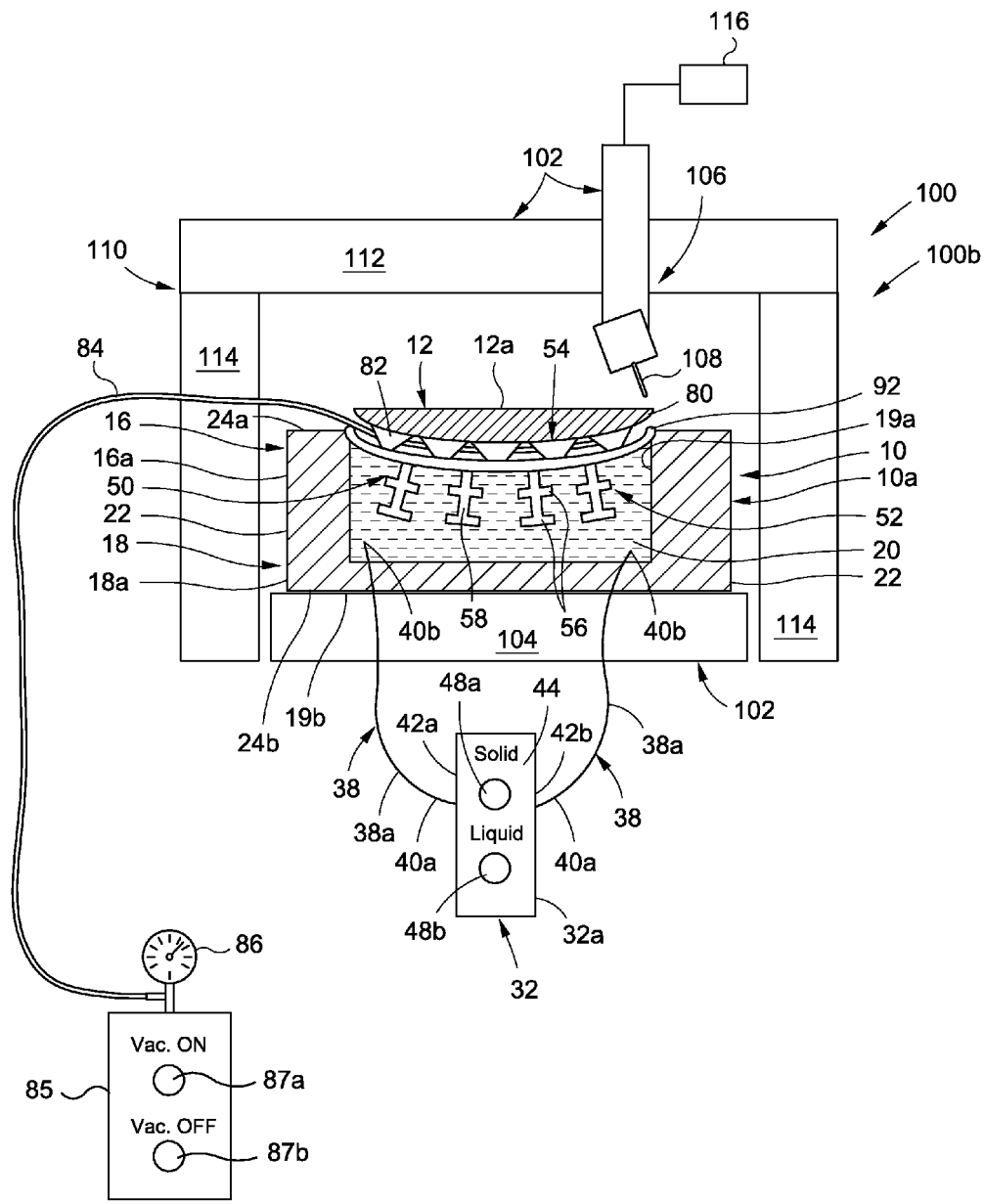
FIG. 3A is a schematic diagram of a partial cross-sectional front view of another embodiment of an adjustable part holding system of the disclosure with another embodiment of an adjustable part holding fixture of the disclosure.

Now referring to the Figures, in one embodiment there is provided an adjustable part holding fixture 10 (see FIGS. 1A, 2A, 3A, 4) for holding a part 12 (see FIGS. 2A, 3A) during one or more processes 14 (see FIG. 5) performed on the part 12 (see FIGS. 2A, 3A). FIG. 1A is a schematic diagram of a top perspective view of an embodiment of the adjustable part holding fixture 10, such as in the form of adjustable part holding fixture 10a.

The part 12 (see FIGS. 2A, 3A) being held by the adjustable part holding fixture 10 (see FIGS. 2A, 3A) may be in the form of a workpiece 12a (see FIGS. 2A, 3A, 5), an aircraft part 12b (see FIG. 5), or another suitable part to be processed. The one or more processes 14 (see FIG. 5) may comprise one or more manufacturing processes 14a (see FIG. 5) or operations, including but not limited to, machining, milling, cutting, drilling, trimming, shaping, turning, boring, grinding, planing, or another suitable manufacturing process or operation.

As used herein, "part" or "workpiece" means a piece of composite, a piece of metal, a piece of a combination of composite and metal, or a piece made of another material, that is held by the adjustable part holding fixture 10 (see FIGS. 1A, 2A, 3A, 4) during one or more processes 14 (see FIG. 5), such as one or more manufacturing processes 14a (see FIG. 5) or operations, performed on the part 12 (see FIGS. 2A, 3A), where the one or more processes 14 (see FIG. 5), include but are limited to, machining, milling, cutting, drilling, trimming, shaping, turning, boring, grinding, planing, or another suitable manufacturing process or operation.

As used herein, a "fixture" means a holding device for securely mounting or supporting a part 12 (see FIGS. 2A, 3A), such as a workpiece 12a (see FIGS. 2A, 3A), during one or more processes 14 (see FIG. 5), such as one or more manufacturing processes 14a (see FIG. 5) or operations, to ensure that the parts or structures produced using the fixture will maintain conformity and interchangeability.

The adjustable part holding fixture 10 (see FIGS. 1A, 2A, 3A, 4) is preferably adjustable and reconfigurable and is designed to hold and accommodate a plurality of parts 12 (see FIG. 2A), such as workpieces 12a (see FIG. 2A), of different contours and shapes without the need for reconstruction of the adjustable part holding fixture 10 (see FIGS. 1A, 2A, 3A, 4) and without the need for additional fixtures for each part shape. The adjustable part holding fixture 10 (see FIGS. 1A, 2A, 3A, 4) is preferably portable and has a compact design which allows for easy assembly and disassembly, as compared to known solid and flexible part holding fixtures.

As shown in FIG. 1A, the adjustable part holding fixture 10 comprises a base assembly 16, such as in the form of base assembly 16a. The base assembly 16 (see FIG. 1A) comprises a container 18 (see FIG. 1A) having an interior 19a (see FIG. 1A) and an exterior 19b (see FIG. 1A). The base assembly 16 (see FIG. 1A) further comprises a phase change material (PCM) 20 (see FIGS. 1A, 2A, 3A, 4) contained within the interior 19a (see FIG. 1A) of the container 18 (see FIG. 1A).

As shown in FIG. 1A, the container 18 comprises four sides 22, a first end 24a, and a second end 24b. As shown in FIG. 1A, the first end 24a is a top end that is preferably open, and the second end 24b is a bottom end that is preferably closed. The container 18 (see FIG. 1A) preferably has a box-shaped configuration 26 (see FIG. 1A). However, the container 18 (see FIG. 1A) may also have another suitable shape or configuration.

As used herein, "phase change material (PCM)" means a material with a high heat of fusion which, melting and solidifying at a certain temperature, is capable of storing and releasing large amounts of thermal energy, and heat is absorbed or released when the material changes from a rigid state, i.e., solid, to a non-rigid state, i.e., liquid, and from a non-rigid state, i.e., liquid, to a rigid state, i.e., solid. The thermal energy required to melt the phase change material is typically referred to as the latent heat of fusion. When phase change materials reach the temperature at which they change phase, i.e., melting point, they absorb large amounts of heat without getting hotter. When the ambient temperature in the area around the phase change material decreases, the phase change material solidifies, releasing its stored latent heat. Phase change materials absorb and release latent heat while maintaining a nearly constant temperature. A solid to liquid phase change material is preferred for the adjustable part holding fixture 10 (see FIG. 1A) that reuses the phase change material.

Figure 4:
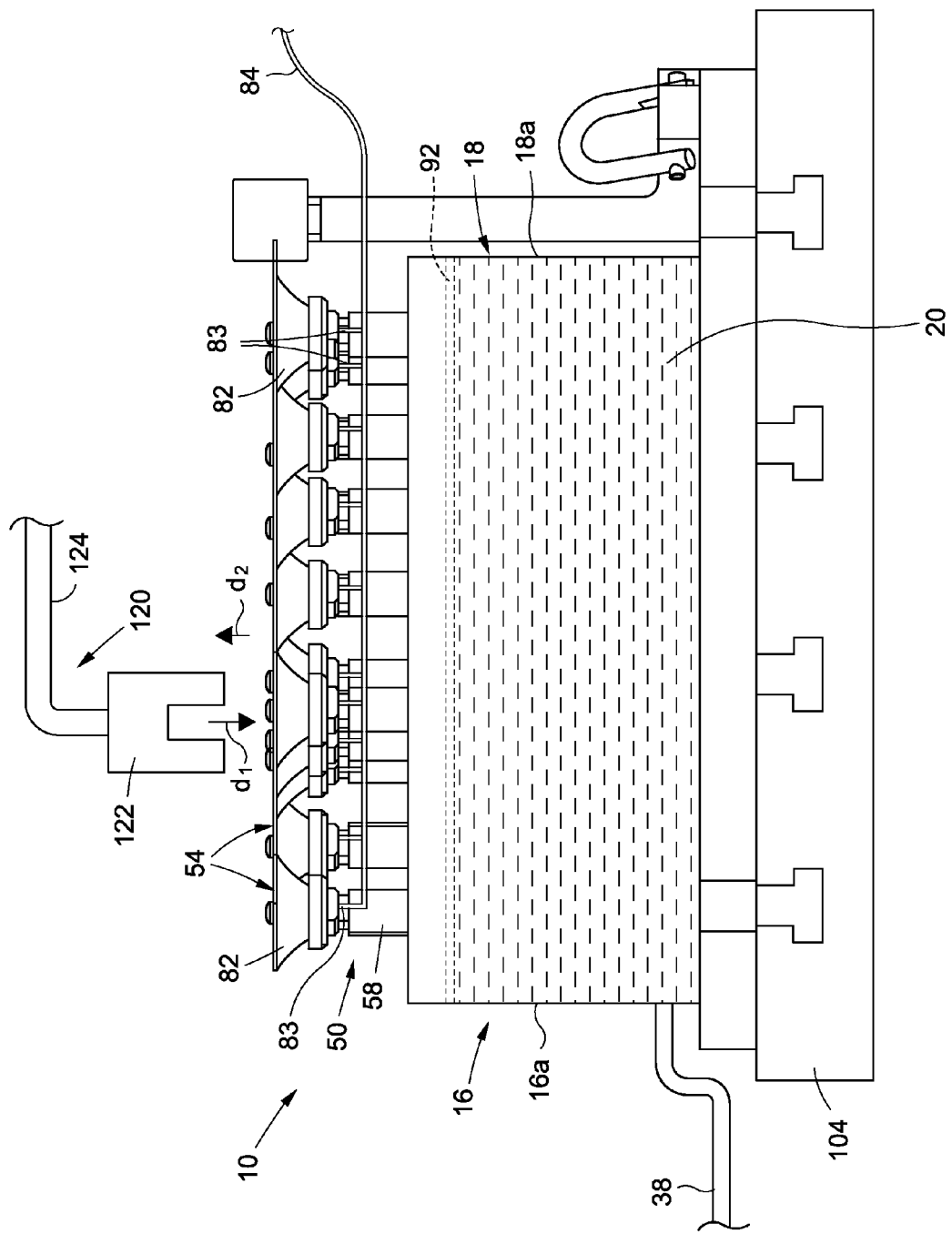
FIG. 4 is an illustration of a front perspective view of an embodiment of an adjustable part holding fixture of the disclosure shown with a robotic assembly.
Figure 5:
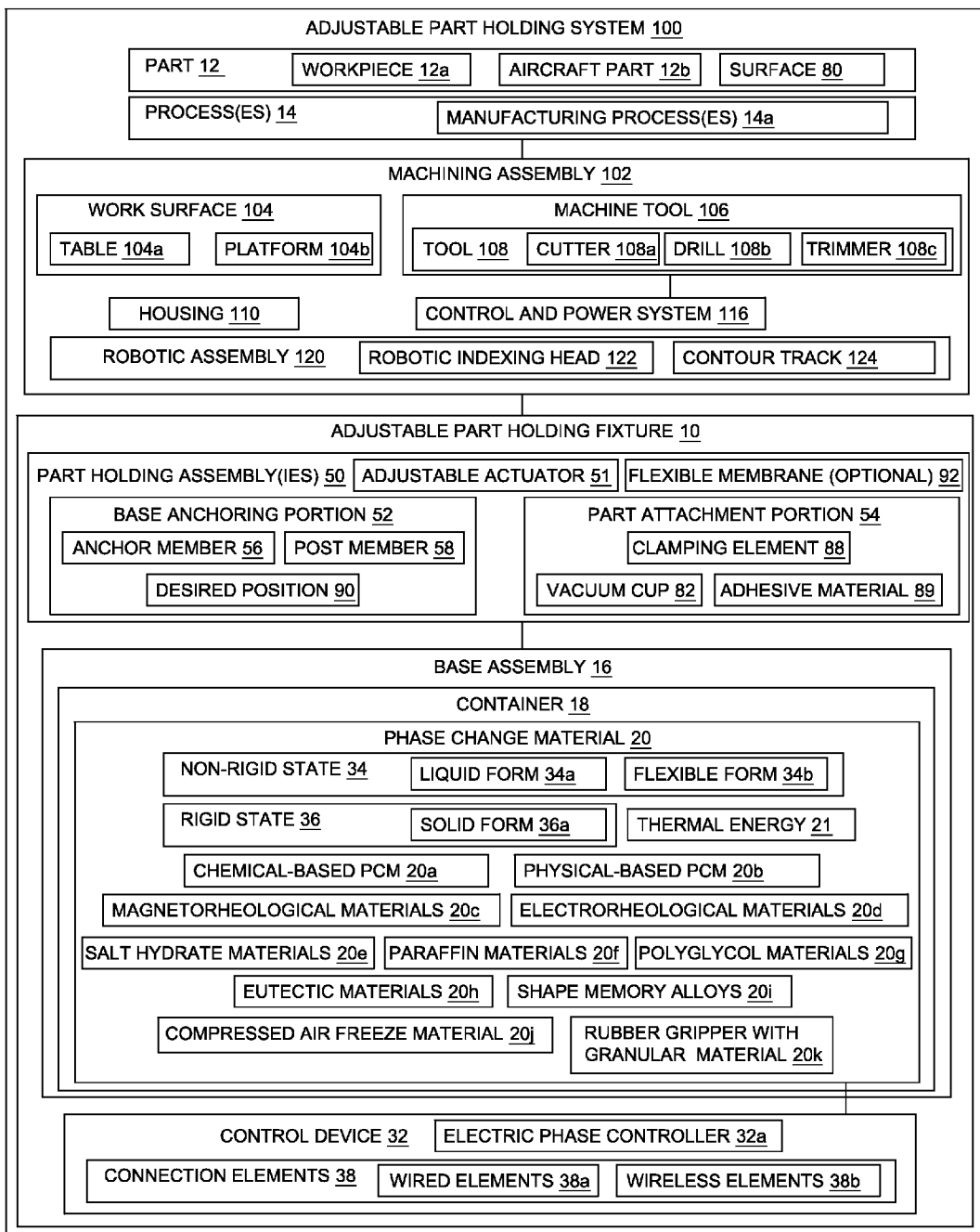
FIG. 5 is an illustration of a functional block diagram showing an exemplary embodiment of an adjustable part holding system of the disclosure.

The phase change material (PCM) 20 (see FIGS. 1A, 2A, 3A, 4, 5) used with the adjustable part holding fixture 10 (see FIGS. 1A, 2A, 3A, 4, 5) may comprise a chemical-based phase change material (PCM) 20a (see FIG. 5) or a physical-based phase change material (PCM) 20b (see FIG. 5). The phase change material 20 (see FIGS. 1A, 2A, 3A, 4, 5) is preferably a material capable of storing and releasing thermal energy 21 (see FIG. 5).

The phase change material 20 (see FIGS. 1A, 2A, 3A), such as the chemical-based phase change material (PCM) 20a (see FIG. 5), preferably comprises one or more of the following: magnetorheological materials 20c (see FIG. 5), electrorheological materials 20d (see FIG. 5), inorganic materials such as salt hydrate materials 20e (see FIG. 5), organic materials such as paraffin materials 20f (see FIG. 5) and polyglycol materials 20g (see FIG. 5), eutectic materials 20h (see FIG. 5), shape memory alloys 20i (see FIG. 5), a combination thereof, or another suitable chemical-based phase change material 20 (see FIGS. 1A, 2A, 3A, 4, 5). The phase change material 20 (see FIGS. 1A, 2A, 3A), such as the physical-based phase change material (PCM) 20b (see FIG. 5), preferably comprises compressed air freeze material 20j (see FIG. 5), rubber gripper with granular material 20k, such as sand material, (see FIG. 5), or another suitable physical-based phase change material 20 (see FIGS. 1A, 2A, 3A, 4, 5).

As used herein, "magnetorheological (MR) material" means a material, such as a fluid, that changes the way it flows in the presence of a magnetic field. When exposed to a magnetic field, the rheology of magnetorheological materials or fluids reversibly and instantaneously changes from a free-flowing liquid to a semi-solid with controllable yield strength. A typical response time, i.e., time to change from a liquid to a solid or from a solid to a liquid, for preferred magnetorheological materials or fluids is less than 5 ms (five milliseconds). A typical magnetorheological material or fluid consists of 20%-40% (percent) by volume of relatively pure, 3-10 micron diameter iron particles, suspended in a carrier liquid, such as mineral oil, synthetic oil, water or glycol. Magnetorheological fluids made from iron particles may exhibit maximum yield strengths of 50-100 kPa (kilopascal) for applied magnetic fields of 150-250 kA/m (kiloamperes per meter). Magnetorheological materials or fluids may be advantageous to use because they may not be highly sensitive to moisture or other contaminants that might be encountered during manufacture and usage.

As used herein, "electrorheological material" means a material, such as a colloidal suspension of extremely fine non-conducting particles (up to 50 (fifty) micrometers diameter) in an electrically insulating fluid, that changes the way it flows in the presence of an applied electric field. The apparent viscosity of electrorheological materials or fluids changes reversibly by an order of up to 100,000 in response to an applied electric field. When exposed to an electric field, the rheology of electrorheological materials or fluids reversibly and instantaneously changes from a liquid to a gel or semi-solid and the electrorheological materials or fluids form fibrous structures which are parallel to the applied electric field. A typical response time, i.e., time to change from a liquid to a gel or semi-solid, or from a gel or semi-solid to a liquid, for preferred electrorheological materials or fluids is less than 5 ms (five milliseconds).

As shown in FIG. 1A, the adjustable part holding fixture 10 further comprises a control device 32 coupled to the phase change material 20 in the container 18. The control device 32 (see FIG. 1A) is configured to convert the phase change material 20 (see FIG. 1A) between a non-rigid state 34 (see FIG. 5) and a rigid state 36 (see FIG. 5). The non-rigid state 34 (see FIG. 5) may comprise a liquid form 34a (see FIG. 5), a flexible form 34b (see FIG. 5), or another suitable non-rigid state 34 (see FIG. 5) or form. The rigid state 36 (see FIG. 5) may comprise a solid form 36a (see FIG. 5) or another suitable rigid state 36 (see FIG. 5) or form. The control device 32 (see FIG. 1A) preferably comprises an electric phase controller 32a (see FIG. 1A) configured to convert the phase change material 20 (see FIG. 1A) between the non-rigid state 34 (see FIG. 5) and the rigid state 36 (see FIG. 5). However, other suitable control devices may also be used.

The control device 32 (see FIG. 1A) allows an operator to command or control the phase change material 20 (see FIG. 1A) to alternate between its non-rigid state 34 (see FIG. 5) and its rigid state 36 (see FIG. 5). The control device 32 (see FIG. 1A), such as the electric phase controller 32a (see FIG. 1A), preferably has the ability to selectively affect the state of the phase change material 20 (see FIG. 1A) for holding an individual base anchoring portion 52 (see FIG. 2A) of a part holding assembly 50 (see FIG. 2A) and/or for holding each base anchoring portion 52 (see FIG. 2A) of all the part holding assemblies 50 (see FIG. 2A) simultaneously.

The mechanism of change is dependent upon the phase change material 20 (see FIGS. 1A, 2A) used or chosen. For example, a magnetorheological material 20c (see FIG. 5) may have a control device 32 (see FIGS. 1A, 2A) which applies a magnetic field to the magnetorheological material 20c (see FIG. 5), such that the magnetorheological material 20c (see FIG. 5) will no longer flow when in its rigid state 36 (see FIG. 5), or the magnetic field may be removed to allow the magnetorheological material 20c (see FIG. 5) to flow. The magnetic field may be applied, for example, by the use of electrical current which generates the magnetic field, or by the use of a physical magnet. An electrically generated magnetic field may be controlled by a device which turns on and off the electricity generating the magnetic field. A physical magnet may be placed, such that the proximity of the magnetic field may affect the flow or non-flow of the magnetorheological material 20c (see FIG. 5). Chemical-based phase change materials 20a (see FIG. 5) preferably change their state or phase between the rigid state 36 (see FIG. 5), such as the solid form 36a (see FIG. 5) and the non-rigid state 34 (see FIG. 5), such as the liquid form 34a (see FIG. 5), by addition of chemicals which cause a reaction to take place changing the state or phase of the chemical-based phase change materials 20a (see FIG. 5). Chemical-based phase change materials 20a (see FIG. 5) may be affected by application or removal of electrical energy or thermal energy 21 (see FIG. 5), in which case a control device 32 that can control the application or removal of energy may be needed. Shape memory alloys 20i (see FIG. 5) may be affected by electrical or heat energy. A control device 32 (see FIG. 1A), such as a shape memory alloy controller, preferably applies electricity to the shape memory alloy 20i (see FIG. 5), or changes its temperature via a heating element.

As further shown in FIG. 1A, the control device 32 is preferably coupled to the phase change material 20 via one or more connection elements 38. The one or more connection elements 38 (see FIG. 1A) may comprise one or more wired elements 38a (see FIG. 1A) or may comprise one or more wireless elements 38b (see FIG. 5). FIG. 1A shows the control device 32 having a connection element 38, such as in the form of wired element 38a, having a first end 40a and a second end 40b. As shown in FIG. 1A, the first end 40a of the connection element 38 is connected at attachment portion 42 of the control device 32, and the second end 40b of the connection element 38 is connected through the exterior 19b of the container 18 to the phase change material 20 in the interior 19a of the container 18.

The control device 32 (see FIG. 1A), such as in the form of electric phase controller 32a (see FIG. 1A), preferably comprises a control panel 44 (see FIG. 1A). In one embodiment, the control panel 44 (see FIG. 1A) may comprise an "off" control 46a (see FIG. 1A) for turning off the control device 32 (see FIG. 1A) and an "on" control 46b (see FIG. 1A) for turning on the control device (see FIG. 1A).

As shown in FIG. 1A, the adjustable part holding fixture 10 further comprises a plurality of part holding assemblies 50 inserted into or partially embedded within the phase change material 20 and configured to be held in place by the phase change material 20, while the phase change material 20 is in the rigid state 36 (see FIG. 5). The part holding assemblies 50 (see FIGS. 1A, 2A, 3A, 4) are further configured to hold and secure the part 12 (see FIGS. 2A, 3A) in place.

Figure 1B:
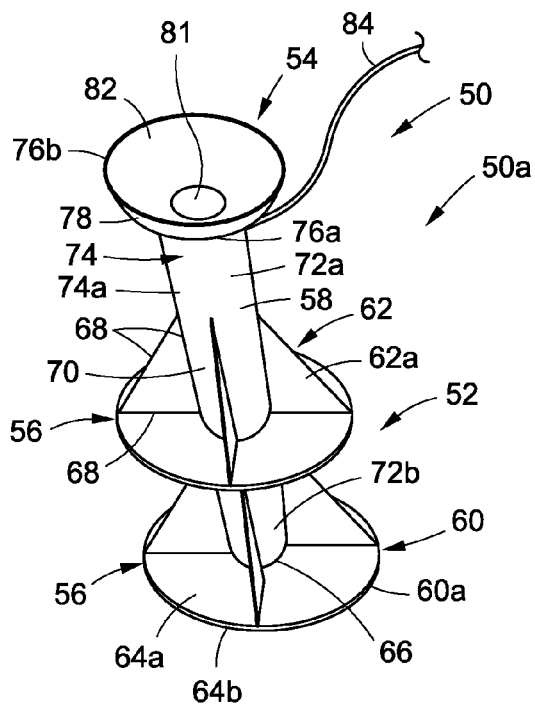
FIG. 1B is a schematic diagram of an enlarged perspective view of an embodiment of a part holding assembly of the adjustable part holding fixture of FIG. 1A.

FIG. 1B is a schematic diagram of an enlarged perspective view of an embodiment of the part holding assembly 50, such as in the form of part holding assembly 50a, of the adjustable part holding fixture 10 of FIG. 1A. The part holding assembly 50 (see FIGS. 1A, 5) is preferably in the form of an adjustable actuator 51 (see FIG. 5). The part holding assembly 50 (see FIGS. 1A-1B) comprises a base anchoring portion 52 (see FIGS. 1A-1B) coupled to a part attachment portion 54 (see FIGS. 1A-1B).

As shown in FIG. 1B, the base anchoring portion 52 preferably comprises one or more anchor members 56 coupled to or connected to a post member 58 (see also FIG. 1A). In one embodiment, as shown in FIG. 1B, the part holding assembly 50 has two anchor members 56, and each anchor member 56 comprises a flange element 60 and one or more support elements 62. The part holding assembly 50 (see FIG. 1B) may also have additional anchor members 56 (see FIG. 1B).

FIG. 1B shows the flange element 60 in the form of a ring flange 60a. However, the flange element 60 (see FIG. 1B) may also be of another suitable shape or configuration. The flange element 60 (see FIG. 1B) has a top surface 64a (see FIG. 1B), a bottom surface 64b (see FIG. 1B), and a central opening 66 (see FIG. 1B) through which the post member 58 (see FIG. 1B) is preferably inserted.

FIG. 1B shows the support elements 62 in the form of fin supports 62a coupled to and formed around an exterior 70 of the post member 58. However, the support element 62 (see FIG. 1B) may also be of another suitable shape or configuration. Each support element 62 (see FIG. 1B) may have multiple sides 68 (see FIG. 1B), such as three sides 68 (see FIG. 1B), or another suitable number of sides 68 (see FIG. 1B).

The anchor members 56 (see FIG. 1B) facilitate retention of the base anchoring portion 52 (see FIGS. 1A-1B) in the phase change material 20 (see FIG. 1A), when the rigid state 36 (see FIG. 5) is activated by the control device 32 (see FIG. 1A). The base anchoring portion 52 (see FIGS. 1A-1B), in particular, is preferably configured for partial insertion into and positioning within the phase change material 20 (see FIG. 1A) in the container 18 (see FIG. 1A).

As shown in FIG. 1B, the post member 58 has a first end 72a, a second end 72b, and an elongated body 74 therebetween. FIG. 1B shows the elongated body 74 in the form of an elongated cylindrical body 74a. Ho ever, the elongated body 74 (see FIG. 1B) of the post member 58 (see FIG. 1B) may also be of another suitable shape or configuration.

Preferably, the base anchoring portion 52 (see FIG. 1B) is made of a sufficiently stiff and strong material capable of supporting the weight of the part 12 (see FIG. 2A). For example, the base anchoring portion 52 (see FIG. 1B) may be constructed of a metallic material, such as aluminum, stainless steel, or another suitable metallic material; a composite material, such as a carbon fiber based material; a rigid plastic material; or another suitably strong and stiff material.

As further shown in FIG. 1B, the part attachment portion 54 has a base end 76a, a part contacting end 76b, and a body 78 therebetween. The base end 76a (see FIG. 1B) of the part attachment portion 54 (see FIG. 1B) is coupled to or attached to the first end 72a (see FIG. 1B) of the post member 58 (see FIG. 1B). The part contacting end 76b (see FIG. 1B) is preferably open and configured for contacting a surface 80 (see FIG. 2A) of the part 12 (see FIG. 2A). The part attachment portion 54 (see FIG. 1B) is designed to fit against a variety of shapes and contours of the part 12 (see FIG. 2A) to be held.

In one embodiment, as shown in FIG. 1B, the part attachment portion 54 is in the form of a vacuum cup 82 or suction cup. Preferably, the vacuum cup 82 (see FIG. 1B) is configured for attachment to a vacuum tubing 84 (see FIG. 1B) that supplies a vacuum or provides air pressure from a separate vacuum generator 85 (see FIG. 2A) or a pneumatic source through an opening 81 (see FIG. 1B) in the vacuum cup 82 (see FIG. 1B). Alternatively, each vacuum cup 82 may have an integrated vacuum generator (not shown) using pneumatic pressure to generate a vacuum.

The vacuum cups 82 (see FIG. 1A-1B) or suction cups are preferably fluid or pneumatically operated, so as to effectively grasp the surface 80 (see FIG. 2A) of the part 12 (see FIG. 2A), such as the workpiece 12a (see FIG. 2A), and release it, when necessary, in a controlled manner, when the vacuum generator 85 (see FIG. 2A) is turned on or off, respectively. The vacuum cups 82 (see FIGS. 1A-1B) or suction cups are devices known to those skilled in the art.

The part contacting end 76b (see FIG. 1B) of each vacuum cup 82 (see FIG. 1B) preferably has an outer diameter in a range of from about 1 (one) inch to about 10 (ten) inches, or greater, and more preferably, an outer diameter in a range of from about 2 (two) inches to about 4 (four) inches. However, the desired outer diameter size of the part contacting end 76b (see FIG. 1B) of each vacuum cup 82 (see FIG. B) chosen depends on the size of the part 12 (see FIG. 2A) to be held. The vacuum cups 82 (see FIGS. 1A-1B) may be made of a durable material such as a rigid plastic material, a synthetic rubber material such as nitrile rubber, a urethane or polyurethane material, or another suitable durable material.

FIG. 1A shows fifteen (15) part attachment portions 54, such as in the form of vacuum cups 82. However, the actual number used and the positioning of the part attachment portions 54 (see FIG. 1A) are a matter of design choice depending upon the nature and size of the part 12 (see FIG. 2A), such as the workpiece 12a (see FIG. 2A), being held by the part attachment portions 54 (see FIG. 1A).

In other embodiments, the part attachment portion 54 (see FIG. 5) may be in the form of a clamping element 88 (see FIG. 5), such as a mechanical clamp, a powered clamp, or another suitable clamping element 88 (see FIG. 5); an adhesive material 89 (see FIG. 5); a combination of a vacuum cup 82 (see FIG. 1A) and a clamping element 88 (see FIG. 5) or an adhesive material 89 (see FIG. 5), or another suitable part attachment portion 54 (see FIG. 5). Preferably, the part attachment portion 54 (see FIGS. 1B, 2A, 5) contacts and holds the surface 80 (see FIG. 2A) of the part 12 (see FIG. 2A), such as the workpiece 12a (see FIG. 2A), in a manner that does not damage the part 12 (see FIG. 2A), such as the workpiece 12a (see FIG. 2A), and that serves to maintain or hold the curvature of the part 12 (see FIG. 2A), such as the workpiece 12a (see FIG. 2A). The part attachment portion 54 (see FIGS. 1A, 2A) is configured to releasably attach to the surface 80 (see FIG. 2A) of the part 12 (see FIG. 2A), such as the workpiece 12a (see FIG. 2A), being held by the adjustable part holding fixture 10 (see FIGS. 1A, 2A).

The phase change material 20 (see FIGS. 1A, 2A, 3A) in the non-rigid state 34 (see FIG. 5) allows for positioning of the base anchoring portion 52 (see FIGS. 1A, 2A, 3A) and adjusting to the part 12 (see FIGS. 2A, 3A), such as workpiece 12a (see FIGS. 2A, 3A) being held. The phase change material 20 (see FIGS. 1A, 2A, 3A) in the rigid state 36 (see FIG. 5) holds the base anchoring portion 52 (see FIGS. 1A, 2A, 3A) in a desired position 90 (see FIG. 5) and holds the part 12 (see FIGS. 2A, 3A), such as workpiece 12a (see FIGS. 2A, 3A) in place during the one or more processes 14 (see FIG. 5) performed on the part 12 (see FIGS. 2A, 3A), such as workpiece (see FIGS. 2A, 3A).

As shown in FIG. 1A, the adjustable part holding fixture 10 may further comprise a flexible membrane 92, such as in the form of flexible membrane 92a, which is substantially flat and sheet-like. The flexible membrane 92 (see FIG. 1A) is preferably made of a flexible material, such as a flexible rubber material, a flexible thermoplastic material, or another suitably flexible material. The flexible membrane 92 (see FIG. 1A) comprises a first side 94a (see FIG. 1A) and a second side 94b (see FIG. 1A), and has a substantially planar configuration 96 (see FIG. 1A).

The flexible membrane 92 (see FIG. 1A) is preferably positioned over the phase change material 20 (see FIG. 1A) on the first end 24a (see FIG. 1A) of the container 18 (see FIG. 1A). The first side 94a (see FIG. 1A) of the flexible membrane 92 (see FIG. 1A) is preferably facing the phase change material 20 (see FIG. 1A), when the flexible membrane 92 (see FIG. 1A) is positioned over the phase change material 20 (see FIG. 1A). The flexible membrane 92 (see FIG. 1A) is designed to prevent the phase change material 20 (see FIG. 1A) from spilling or leaking out of the container 18 (see FIG. 1A).

In one embodiment, as shown in FIG. 1A, the flexible membrane 92, such as in the form of flexible membrane 92a, may have a plurality of openings 98. The plurality of openings 98 (see FIG. 1A) are preferably of a sufficient size to accommodate insertion of each post member 58 (see FIG. 1A) of the part holding assembly 50 (see FIG. 1A) through each respective opening 98 (see FIG. 1A). In another embodiment, as shown in FIG. 3A, the flexible membrane 92, such as in the form of flexible membrane 92b, is solid and has no openings 98 (see FIG. 1A).

Referring now to FIG. 2A, in another embodiment, there is provided an adjustable part holding system 100, such as in the form of adjustable part holding system 100a, for holding a part 12, such as a workpiece 12a, during one or more processes 14 (see FIG. 5), such as one or more manufacturing processes 14a (see FIG. 5) performed on the part 12, such as the workpiece 12a. FIG. 2A is a schematic diagram of a partial cross-sectional front view of an embodiment of the adjustable part holding system 100 of the disclosure with an embodiment of the adjustable part holding fixture 10, such as in the form of adjustable part holding fixture 10b, of the disclosure.

The part 12 (see FIGS. 2A, 5) may comprise the workpiece 12a (see FIGS. 2A, 5), an aircraft part 12b (see FIG. 5), or another suitable part. The one or more manufacturing processes 14a (see FIG. 5) may comprise one or more of machining, milling, cutting, drilling, trimming, shaping, turning, boring, grinding, planing, or another suitable manufacturing process 14a (see FIG. 5) or operation.

As shown in FIG. 2A, the adjustable part holding system 100 comprises a machining assembly 102 comprising at least a work surface 104 and a machine tool 106. The work surface 104 (see FIG. 2A) may comprise a work table 104a (see FIG. 5), a platform 104b (see FIG. 5), or another suitable work surface 104 (see FIG. 2A), on which the adjustable part holding fixture 10 (see FIG. 2A) may be set up, secured, and/or retained.

As used herein, "machine tool" means a machine for machining, milling, cutting, drilling, trimming, shaping, turning, boring, grinding, planing, or another suitable process or operation, such as a manufacturing process 14a (see FIG. 5), of the part 12 (see FIG. 2A), such as the workpiece 12a (see FIG. 2A). The machine tool 106 (see FIG. 2A)

comprises a tool 108 (see FIG. 2A), such as a cutter 108*a* (see FIG. 5), a drill 108*b* (see FIG. 5), a trimmer 108*c* (see FIG. 5), or another suitable device that performs the actual machining, milling, cutting, drilling, trimming, shaping, turning, boring, grinding, planing, or other suitable process or operation, such as a manufacturing process 14*a* (see FIG. 5), of the part 12 (see FIG. 2A), such as the workpiece 12*a* (see FIG. 2A). The relative movement between the part 12 (see FIG. 2A) and the tool 108 (see FIG. 2A) is controlled or constrained by the machine tool 106 (see FIG. 2A). The machine tool 106 may be in the form of, or part of, a CNC (computer numerical control) machine, for example, a milling machine, a lathe, a plasma cutter, an electric discharge machine, or another type of CNC machine.

As shown in FIG. 2A, the machining assembly 102 may further comprise a housing 110 with a top portion 112 and side portions 114 that surround the adjustable part holding fixture 10 and part 12 being held by the adjustable part holding fixture 10. The machine tool 106 (see FIG. 2A) is preferably coupled to a control and power system 116 (see FIG. 2A) configured for controlling and powering the machine tool 106 (see FIG. 2A). The control and power system 116 (see FIG. 2A) may comprise a control assembly, such as comprising one or more computers or microprocessors with an operating system, computer memory, and/or system logic or computer programs, and other control assembly devices known to those skilled in the art. The control and power system 116 may further comprise a power assembly, such as comprising, a power supply such as batteries, electricity, or other power supply elements known to those skilled in the art.

As shown in FIG. 2A, the adjustable part holding system 100 further comprises a portable, adjustable part holding fixture 10, such as in the form of adjustable part holding fixture 10*b*, installed in the machining assembly 102. The adjustable part holding fixture 10 (see FIG. 2A) comprises a base assembly 16 (see FIG. 2A), such as in the form of base assembly 16*a* (see FIG. 2A).

The base assembly 16 (see FIG. 2A) comprises a container 18 (see FIG. 2A) having an interior 19*a* (see FIG. 2A) and an exterior 19*b* (see FIG. 2A). As shown in FIG. 2A, the container 18 comprises sides 22, first end 24*a*, and second end 24*b*. In one embodiment, the container 18 (see FIG. 2A) may be in the form of a non-partitioned container 18*a* (see FIG. 2A) having an interior 19*a* (see FIG. 2A) that is open.

The base assembly 16 (see FIG. 2A) further comprises the phase change material 20 (see FIG. 2A) contained within the interior 19*a* (see FIG. 2A) of the container 18 (see FIG. 2A). The phase change material 20 (see FIG. 2A) used in the adjustable part holding system 100 (see FIG. 2A), such as in the form of adjustable part holding system 100*a* (see FIG. 2A), is discussed in detail above.

As shown in FIG. 2A, the adjustable part holding fixture 10 further comprises the control device 32, such as in the form of electric phase controller 32*a*, coupled to the phase change material 20 in the container 18. The control device 32 (see FIG. 2A) is configured to convert the phase change material 20 (see FIG. 2A) between the non-rigid state 34 (see FIG. 5) and the rigid state 36 (see FIG. 5).

As shown in FIG. 2A, the control device 32, such as in the form of electric phase controller 32*a*, has a control panel 44 that may comprise a "solid" control 48*a* and a "liquid" control 48*b*. The "solid" control 48*a* (see FIG. 2A) is configured to convert the phase change material 20 (see FIG. 2A) from a non-rigid state 34 (see FIG. 5), such as a liquid form 34*a* (see FIG. 5), to a rigid state 36 (see FIG. 5), such as a solid form 36*a* (see FIG. 5). The "liquid" control 48*b* (see FIG. 2A) is configured to convert the phase change material 20 (see FIG. 2A) from the rigid state 36 (see FIG. 5), such as the solid form 36*a* (see FIG. 5), to the non-rigid state 34 (see FIG. 5), such as the liquid form 34*a* (see FIG. 5).

FIG. 2A shows the control device 32 connected to the phase change material 20 via two connection elements 38, such as wired elements 38*a*, each having a first end 40*a* and a second end 40*b*. As shown in FIG. 2A, the first end 40*a* of each connection element 38 is connected at respective attachment portions 42*a*, 42*b*, of the control device 32, and the second end 40*b* of each connection element 38 is connected through the exterior 19*b* of the container 18 to the phase change material 20 in the interior 19*a* of the container 18.

As shown in FIG. 2A, the adjustable part holding fixture 10 further comprises a plurality of part holding assemblies 50 inserted into or partially embedded within the phase change material 20 and configured to be held in place by the phase change material 20, while the phase change material 20 is in the rigid state 36 (see FIG. 5). The part holding assemblies 50 (see FIG. 2A) are further configured to releasably attach to the surface 80 (see FIG. 2A) of the part 12 (see FIG. 2A), such as the workpiece 12*a* (see FIG. 2A), being held by the adjustable part holding fixture 10*b* (see FIG. 2A) and are configured to hold and secure the part 12 (see FIG. 2A) in place.

Each part holding assembly 50 (see FIG. 2A) comprises the base anchoring portion 52 (see FIG. 2A) coupled to the part attachment portion 54 (see FIG. 2A). The base anchoring portion 52 (see FIG. 2A) preferably comprises one or more anchor members 56 (see FIG. 2A) connected to the post member 58 (see FIG. 2A). Each part attachment portion 54 (see FIG. 2A) is preferably configured to releasably attach to the surface 80 (see FIG. 2A) of the part 12 (see FIG. 2A) being held by the adjustable part holding fixture 10 (see FIG. 2A).

As shown in FIG. 2A, the part attachment portion 54 may be in the form of a vacuum cup 82 or suction cup. Preferably, each vacuum cup 82 (see FIG. 2A) is configured for attachment to the vacuum tubing 84 (see FIG. 2A) via a fitting 83 (see FIG. 2A). The vacuum tubing 84 (see FIG. 2A) supplies a vacuum or provides air pressure to the vacuum cups 82 (see FIG. 2A) from a separate vacuum generator 85 (see FIG. 2A) or a pneumatic source. Alternatively, each vacuum cup 82 may have an integrated vacuum generator (not shown) using pneumatic pressure to generate a vacuum.

FIG. 2A shows an embodiment of the vacuum generator 85 that may be used with the adjustable part holding system 100. As shown in FIG. 2A, the vacuum generator 85 comprises a pressure regulator 86, a "Vac. ON" (Vacuum ON) control 87*a* that turns on or activates the vacuum generator 85, and a "Vac. OFF" (Vacuum OFF) control 87*b* that turns off or deactivates the vacuum generator 85. Other known vacuum generators or pneumatic sources may alternatively be used. The vacuum generator 85 may comprise an air vacuum generator with a venturi device that converts air pressure or compressed air from an air compressor into a vacuum and may integrate vacuum sensors and switches, supply and release valves, and/or various other vacuum generator components.

FIG. 2A shows three (3) part attachment portions 54, such as in the form of vacuum cups 82. However, the actual number used and the positioning of the part attachment portions 54 (see FIG. 2A) are a matter of design choice depending upon the nature and size of the part 12 (see FIG. 2A), such as the workpiece 12*a* (see FIG. 2A), to be held. An exemplary vacuum cup 82 (see FIG. 2A) having a part contacting end 76b (see FIG. 2C) with an outer diameter of about 3 (three) inches may apply a vacuum load of about 50 lbs (pounds).

As discussed above, the vacuum cups 82 (see FIG. 2A) or suction cups are preferably fluid or pneumatically operated, so as to effectively grasp the surface 80 (see FIG. 2A) of the part 12 (see FIG. 2A), such as the workpiece 12a (see FIG. 2A), and release it, when necessary, in a controlled manner. The vacuum cups 82 (see FIG. 2A) or suction cups are known to those skilled in the art.

As further discussed above, the part attachment portion 54 (see FIG. 2A) may alternatively comprise one or more of a vacuum cup 82 (see FIG. 2A), a clamping element 88 (see FIG. 5), an adhesive material 89 (see FIG. 5), or another suitable part attachment portion 54 (see FIG. 5). The part attachment portion 54 (see FIG. 2A) preferably contacts and holds the surface 80 (see FIG. 2A) of the part 12 (see FIG. 2A), such as the workpiece 12a (see FIG. 2A), in a manner that does not damage the part 12 (see FIG. 2A), such as the workpiece 12a (see FIG. 2A), and that serves to maintain or hold the curvature of the part 12 (see FIG. 2A), such as the workpiece 12a (see FIG. 2A).

FIG. 2A shows the adjustable part holding system 100 with the part 12, such as the workpiece 12a, being held by the adjustable part holding fixture 10. The phase change material 20 (see FIG. 2A) in the non-rigid state 34 (see FIG. 5) allows for positioning of the base anchoring portion 52 (see FIG. 2A) and adjusting of the base anchoring portion 52 (see FIG. 2A) to the part 12 (see FIG. 2A) being held. The phase change material 20 (see FIG. 2A) in the rigid state 36 (see FIG. 5) holds the base anchoring portion 52 (see FIG. 2A) in a desired position 90 (see FIG. 5) and holds the part 12 (see FIG. 2A) in place during the one or more processes 14 (see FIG. 5), such as one or more manufacturing processes 14a (see FIG. 5), performed on the part (see FIG. 2A).

Figure 2B:
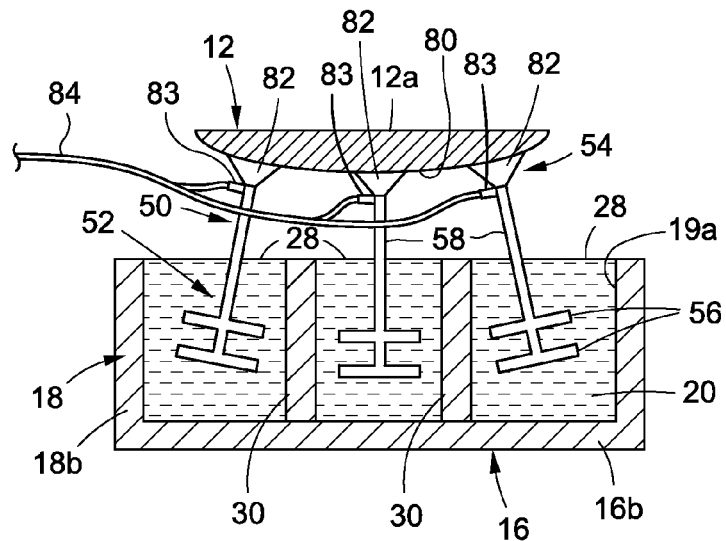
FIG. 2B is a schematic diagram of a cross-sectional front view of another embodiment of a base assembly that may be used in the adjustable part holding fixture of FIG. 2A.

FIG. 2B is a schematic diagram of a cross-sectional front view of another embodiment of a base assembly 16, such as in the form of base assembly 16b, that may be used in the adjustable part holding fixture 10 of FIG. 2A. In this embodiment, the container 18 (see FIG. 2B) of the base assembly 16 (see FIG. 2B), such as in the form of base assembly 16b (see FIG. 2B), is in the form of a partitioned container 18b (see FIG. 2B).

The partitioned container 18b (see FIG. 2B) has an interior 19a (see FIG. 2B) with two or more separate compartments 28 (see FIG. 2B) separated by one or more partitions 30 (see FIG. 2B). Each separate compartment 28 (see FIG. 2B) is preferably configured to separately hold, in the phase change material 20 (see FIG. 2B), the anchor members 56 (see FIG. 2B) and a portion of the post member 58 (see FIG. 2B) of the base anchoring portion 52 (see FIG. 2B) of each part holding assembly 50 (see FIG. 2B). FIG. 2B shows each part attachment portion 54, such as in the form of vacuum cup 82, of each part holding assembly 50, coupled to the surface 80 of the part 12, such as workpiece 12a. FIG. 2B further shows each vacuum cup 82 attached to the vacuum tubing 84 via a fitting 83.

Figure 2C:
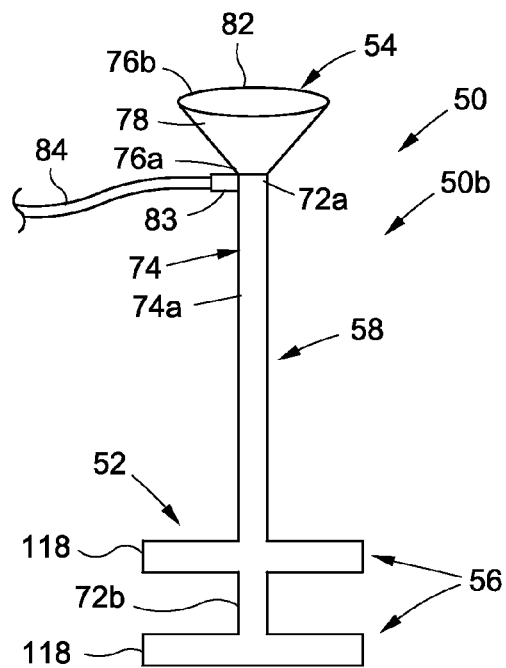
FIG. 2C is a schematic diagram of an enlarged plan view of a part holding assembly of the adjustable part holding fixture of FIG. 2A.

FIG. 2C is a schematic diagram of an enlarged plan view of a part holding assembly 50, such as in the form of part holding assembly 50b, of the adjustable part holding fixture 10b of FIG. 2A. The part holding assembly 50 (see FIG. 2C), such as in the form of part holding assembly 50b (see FIG. 2C), is preferably in the form of an adjustable actuator 51 (see FIG. 5). As shown in FIG. 2C, the part holding assembly 50 comprises the base anchoring portion 52 coupled to the part attachment portion 54.

As shown in FIG. 2C, the base anchoring portion 52 preferably comprises one or more anchor members 56 connected to the post member 58. As discussed above, preferably, the base anchoring portion 52 (see FIG. 2C) is made of a sufficiently stiff and strong material capable of supporting the weight of the part 12 (see FIG. 2A).

In the embodiment shown in FIG. 2C, the part holding assembly 50 has one or more anchor members 56 coupled to or connected to the post member 58. Each anchor member 56 (see FIG. 2C) may comprise a lateral bar portion 118 (see FIG. 2C). FIG. 2C shows the part holding assembly 50 with two anchor members 56. However, the part holding assembly 50 (see FIG. 2C) may also have additional anchor members 56 (see FIG. 2C). The lateral bar portions 118 (see FIG. 2C) facilitate retention of the base anchoring portion 52 (see FIG. 2C) in the phase change material 20 (see FIG. 2A), when the rigid state 36 (see FIG. 5) is activated by the control device 32 (see FIG. 2A). The base anchoring portion 52 (see FIGS. 2A-2C), in particular, is preferably configured for partial insertion into and positioning within the phase change material 20 (see FIG. 2A) contained within the container 18 (see FIG. 2A).

FIG. 2C shows the post member 58 with the first end 72a, the second end 72b, and the elongated body 74, such as in the form of elongated cylindrical body 74a, therebetween. FIG. 2C shows the elongated body 74 in the form of an elongated cylindrical body 74a. However, the elongated body 74 (see FIG. 2C) of the post member 58 (see FIG. 2C) may also be of another suitable shape or configuration.

FIG. 2C further shows the part attachment portion 54, such as in the form of vacuum cup 82, with the base end 76a, the part contacting end 76b, and the body 78 therebetween. The base end 76a (see FIG. 2C) of the part attachment portion 54 (see FIG. 2C) is coupled to or attached to the first end 72a (see FIG. 2C) of the post member 58 (see FIG. 2C). The part contacting end 76b (see FIG. 2C) is configured for contacting the contact surface 80 (see FIG. 2A) of the part 12 (see FIG. 2A). The part attachment portion 54 (see FIG. 2C) is designed to fit to or against a variety of shapes and contours of the part 12 (see FIG. 2A) to be held. Preferably, the vacuum cup 82 (see FIG. 2C) is attached to the vacuum tubing 84 (see FIG. 2C) via fitting 83 (see FIG. 2C).

As discussed above, preferably, the base anchoring portion 52 (see FIG. 2C) is made of a sufficiently stiff and strong material capable of supporting the weight of the part 12 (see FIG. 2A). For example, the base anchoring portion 52 (see FIG. 2C) may be constructed of a metallic material, such as aluminum, stainless steel, or another suitable metallic material; a composite material, such as a carbon fiber based material; a rigid plastic material or another suitably strong and stiff material.

Referring now to FIG. 3A, FIG. 3A is a schematic diagram of a partial cross-sectional front view of another embodiment of an adjustable part holding system 100, such as in the form of adjustable part holding system 100b, of the disclosure with another embodiment of the adjustable part holding fixture 10, such as in the form of adjustable part holding fixture 10a, having a flexible membrane 92. The adjustable part holding system 100 (see FIG. 3A), such as in the form of adjustable part holding system 100b (see FIG. 3A), is configured to hold the part 12 (see FIG. 3A), such as the workpiece 12a (see FIG. 3A), during one or more processes 14 (see FIG. 5), such as one or more manufacturing processes 14a (see FIG. 5) performed on the part 12 (see FIG. 3A), and discussed in detail above.

Similar to the adjustable part holding system 100 of FIG. 2A, the adjustable part holding system 100 in FIG. 3A comprises the machining assembly 102 having at least the work surface 104 and the machine tool 106. The work surface 104 (see FIG. 3A) may comprise a work table 104a (see FIG. 5), a platform 104b (see FIG. 5), or another suitable work surface 104 (see FIG. 3A) on which the adjustable part holding fixture 10 (see FIG. 3A) may be set up, secured, and/or retained.

The machine tool 106 (see FIG. 3A), discussed in detail above, comprises the tool 108 (see FIG. 3A). The machining assembly 102 (see FIG. 3A) may further comprise the housing 110 (see FIG. 3A) with the top portion 112 (see FIG. 3A) and side portions 114 (see FIG. 3A) that surround the adjustable part holding fixture 10 (see FIG. 3A) and part 12 (see FIG. 3A) being held by the adjustable part holding fixture 10 (see FIG. 3A). The machine tool 106 (see FIG. 3A) is preferably coupled to the control and power system 116 (see FIG. 3A), discussed in detail above, that is configured for controlling and powering the machine tool 106 (see FIG. 3A).

As shown in FIG. 3A, the adjustable part holding system 100 further comprises the portable, adjustable part holding fixture 10, such as in the form of manual adjustable part holding fixture 10a, installed in the machining assembly 102. The adjustable part holding fixture 10 (see FIG. 3A) comprises the base assembly 16 (see FIG. 3A), such as in the form of base assembly 16a (see FIG. 3A).

The base assembly 16 (see FIG. 3A) comprises the container 18 (see FIG. 3A), such as in the form of non-partitioned container 18a (see FIG. 3A), having an interior 19a (see FIG. 3A), an exterior 19b (see FIG. 3A), sides 22, a first end 24a, and a second end 24b. The base assembly 16 (see FIG. 3A) further comprises the phase change material 20 (see FIG. 3A) contained within the interior 19a (see FIG. 3A) of the container 18 (see FIG. 3A). The phase change material 20 (see FIG. 3A) used in the adjustable part holding system 100 (see FIG. 3A), such as in the form of adjustable part holding system 100b (see FIG. 3A), is discussed in detail above.

Similar to the adjustable part holding system 100a of FIG. 2A, the adjustable part holding system 100b in FIG. 3A comprises the control device 32, such as in the form of electric phase controller 32a, coupled to the phase change material 20 in the container 18. The control device 32 (see FIG. 3A) is configured to convert the phase change material 20 (see FIG. 3A) between the non-rigid state 34 (see FIG. 5) and the rigid state 36 (see FIG. 5).

As shown in FIG. 3A, in this embodiment, similar to the control device 32 in FIG. 2A, the control device 32 has the control panel 44 with the "solid" control 48a and the "liquid" control 48b, and two connection elements 38, such as wired elements 38a, each having a first end 40a and a second end 40b. As shown in FIG. 3A, the first end 40a of each connection element 38 is connected to respective attachment portions 42a, 42b, of the control device 32, and the second end 40b of each connection element 38 is connected through the exterior 19b of the container 18 to the phase change material 20 in the interior 19a of the container 18.

As shown in FIG. 3A, the adjustable part holding fixture 10 further comprises the plurality of part holding assemblies 50 inserted into or partially embedded within the phase change material 20 and configured to be held in place by the phase change material 20, while the phase change material 20 is in the rigid state 36 (see FIG. 5). The part holding assemblies 50 (see FIG. 3A) are further configured to releasably attach to the surface 80 (see FIG. 3A) of the part 12 (see FIG. 3A), such as the workpiece 12a (see FIG. 3A), being held by the adjustable part holding fixture 10a (see FIG. 3A) and are configured to hold and secure the part 12 (see FIG. 3A) in place.

In this embodiment shown in FIG. 3A, the adjustable part holding fixture 10a of the adjustable part holding system 100b further comprises a flexible membrane 92 coupled between the base anchoring portions 52 and the part attachment portions 54 of the plurality of part holding assemblies 50. The flexible membrane 92 (see FIG. 3A) is positioned over the phase change material 20 (see FIG. 3A). Each base anchoring portion 52 (see FIG. 3A) preferably comprises one or more anchor members 56 (see FIG. 3A) coupled to or connected to the post member 58 (see FIG. 3A).

As shown in FIG. 3A, the part attachment portion 54 is preferably in the form of vacuum cup 82 or suction cup, discussed in detail above. Preferably, each vacuum cup 82 (see FIG. 3A) is configured for attachment to the vacuum tubing 84 (see FIG. 3A) and may use a fitting 83 (see FIG. 2A). The vacuum tubing 84 (see FIG. 3A) supplies a vacuum or provides air pressure to the vacuum cups 82 (see FIG. 3A) from the separate vacuum generator 85 (see FIG. 3A) or a pneumatic source. Alternatively, each vacuum cup 82 may have an integrated vacuum generator (not shown) using pneumatic pressure to generate a vacuum.

As shown in FIG. 3A, the vacuum generator 85, discussed in detail above, comprises the pressure regulator 86, the "Vac. ON" (Vacuum ON) control 87a that turns on or activates the vacuum generator 85, and the "Vac. OFF" (Vacuum OFF) control 87b that turns off or deactivates the vacuum generator 85. Other known vacuum generators or pneumatic sources may also be used.

FIG. 3A shows three (3) part attachment portions 54, such as in the form of vacuum cups 82. However, the actual number used and positioning of the part attachment portions 54 (see FIG. 3A) are a matter of design choice depending upon the nature and size of the part 12 (see FIG. 3A), such as the workpiece 12a (see FIG. 3A), to be held.

As discussed above, the vacuum cups 82 (see FIG. 3A), or suction cups, are preferably fluid or pneumatically operated, so as to effectively grasp the surface 80 (see FIG. 3A) of the part 12 (see FIG. 3A), such as the workpiece 12a (see FIG. 3A), and release it, when necessary, in a controlled manner. The vacuum cups 82 (see FIG. 3A), or suction cups, are known to those skilled in the art. As further discussed above, the part attachment portion 54 (see FIG. 3A) may alternatively comprise one or more of vacuum cups 82 (see FIG. 3A), or suction cups, clamping elements 88 (see FIG. 5), adhesive materials 89 (see FIG. 5), or other suitable part attachment portions 54 (see FIGS. 3A, 5).

Figure 3B:
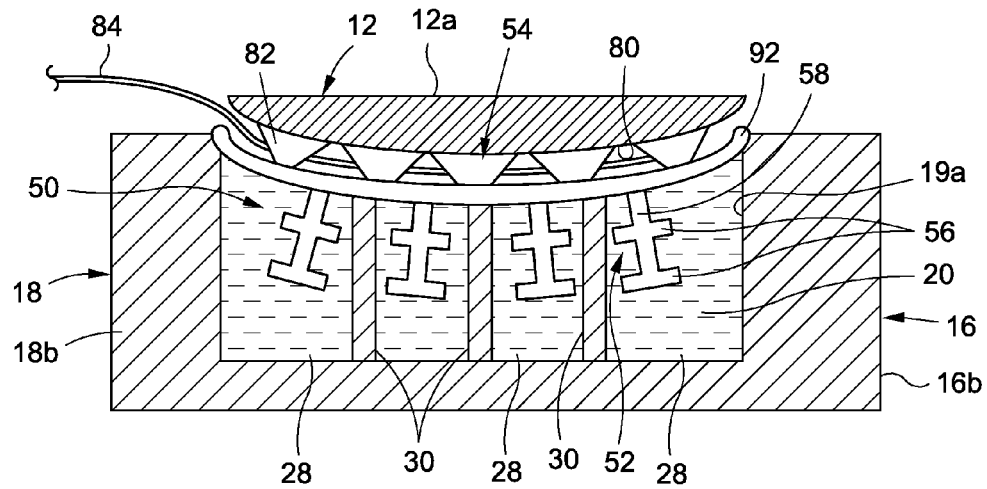
FIG. 3B is a schematic diagram of a cross-sectional front view of another embodiment of a base assembly that may be used in the adjustable part holding fixture of FIG. 3A.

FIG. 3B is a schematic diagram of a cross-sectional front view of another embodiment of a base assembly 16, such as in the form of base assembly 16b, that may be used in the adjustable part holding fixture 10 of FIG. 3A. In this embodiment, the container 18 (see FIG. 3B) of the base assembly 16 (see FIG. 3B), such as in the form of base assembly 16b (see FIG. 3B), is in the form of a partitioned container 18b (see FIG. 3B).

The partitioned container 18b (see FIG. 3B) has an interior 19a (see FIG. 3B) with two or more separate compartments 28 (see FIG. 3B) separated by one or more partitions 30 (see FIG. 3B). Each separate compartment 28 (see FIG. 3B) is preferably configured to separately hold, in the phase change material 20 (see FIG. 3B), the anchor members 56 (see FIG. 3B) and the post member 58 (see FIG. 3B) of the base anchoring portion 52 (see FIG. 3B) of each part holding assembly 50 (see FIG. 3B). FIG. 3B shows each part attachment portion 54, such as in the form of vacuum cup 82, of each part holding assembly 50, coupled to the surface 80 of the part 12, such as workpiece 12a. FIG. 3B further shows each vacuum cup 82 attached to the vacuum tubing 84 and may be attached via a fitting 83 (see FIG. 2B). FIG. 3B further shows the flexible membrane 92 positioned over the phase change material 20 and coupled between the base anchoring portions 52 and the part attachment portions 54 of the plurality of part holding assemblies 50.

Figure 3C:
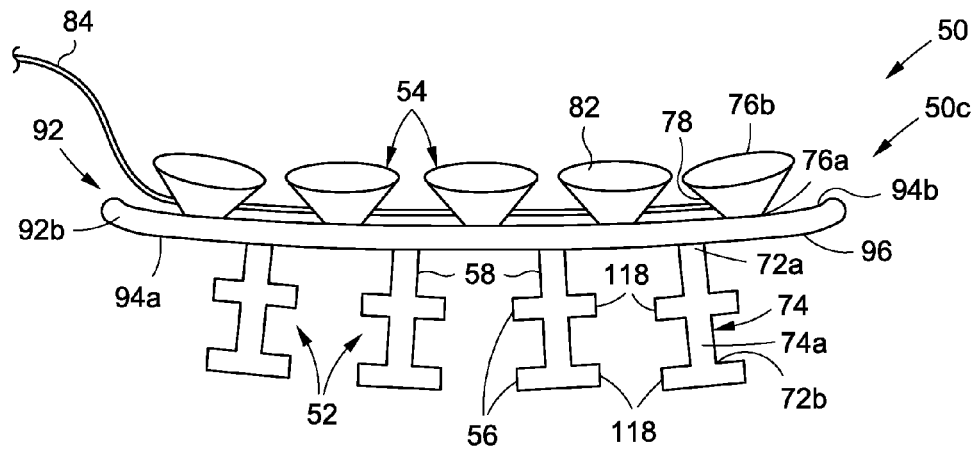
FIG. 3C is a schematic diagram of an enlarged plan view of a plurality of part holding assemblies of the adjustable part holding fixture of FIG. 3A.

FIG. 3C is a schematic diagram of an enlarged plan view of a plurality of part holding assemblies 50, such as in the form of part holding assemblies 50c, of the adjustable part holding fixture 10a of FIG. 3A. The base anchoring portions 52 (see FIG. 3C) of the part holding assemblies 50 (see FIG. 3C), such as in the form of part holding assemblies 50c (see FIG. 3C), are preferably in the form of adjustable actuators 51 (see FIG. 5). As shown in FIG. 3C, the plurality of part holding assemblies 50 comprise the base anchoring portions 52 and the part attachment portions 54 coupled together via the flexible membrane 92, which is positioned between the base anchoring portions 52 and the part attachment portions 54.

As shown in FIG. 3C, each base anchoring portion 52 preferably comprises one or more anchor members 56 coupled to or connected to the post member 58. As discussed in detail above, preferably, the base anchoring portion 52 (see FIG. 3C) is made of a sufficiently stiff and strong material capable of supporting the weight of the part 12 (see FIG. 3A).

Each anchor member 56 (see FIG. 3C) may comprise a lateral bar portion 118 (see FIG. 3C). FIG. 3C shows each base anchoring portion 52 with two anchor members 56. However, the base anchoring portion 52 (see FIG. 3C) may also have additional anchor members 56 (see FIG. 3C). The lateral bar portions 118 (see FIG. 3C) facilitate retention of the base anchoring portion 52 (see FIG. 3C) in the phase change material 20 (see FIG. 3A), when the rigid state 36 (see FIG. 5) is activated by the control device 32 (see FIG. 3A). In this embodiment used with the flexible membrane 92 (see FIG. 3C), the base anchoring portion 52 is preferably configured for complete or full insertion into and positioning within the phase change material 20 (see FIG. 3A) contained within the container 18 (see FIG. 3A).

FIG. 3C shows the post member 58 with the first end 72a, the second end 72b, and the elongated body 74, such as in the form of elongated cylindrical body 74a, therebetween. FIG. 3C shows the elongated body 74 in the form of the elongated cylindrical body 74a. However, the elongated body 74 (see FIG. 3C) of the post member 58 (see FIG. 3C) may also be of another suitable shape or configuration.

FIG. 3C further shows the part attachment portion 54, such as in the form of vacuum cup 82, with the base end 76a, the part contacting end 76b, and the body 78 therebetween. As shown in FIG. 3C, the base end 76a of each part attachment portion 54 is coupled to or attached to the second side 94b of the flexible membrane 92, and the first end 72a of each post member 58 is coupled to or attached to the first side 94a of the flexible membrane 92. The part contacting end 76b (see FIG. 3C) is configured for contacting the contact surface 80 (see FIG. 3A) of the part 12 (see FIG. 3A). The part attachment portion 54 (see FIG. 3C) is designed to fit to or against a variety of shapes and contours of the part 12 (see FIG. 3A) to be held. Preferably, the vacuum cups 82 (see FIG. 3C) are attached to the vacuum tubing 84 (see FIG. 3C) and may be attached via fitting 83 (see FIG. 2B), or another suitable attachment mechanism.

FIG. 3C further shows the flexible membrane 92, which is substantially flat and sheet-like, coupled between the base anchoring portions 52 and the part attachment portions 54 of the plurality of part holding assemblies 50. The flexible membrane 92 (see FIG. 3C) comprises the first side 94a (see FIG. 3C) and the second side 94b (see FIG. 3C), and has a substantially planar configuration 96 (see FIG. 3C). In this embodiment shown in FIG. 3C, the flexible membrane 92, such as in the form of flexible membrane 92b, is solid and has no openings 98 (see FIG. 1A). As discussed in detail above, the flexible membrane 92 (see FIG. 3C) is preferably made of a flexible material, such as a flexible rubber material, a flexible thermoplastic material, or another suitably flexible material.

Referring now to FIG. 4, FIG. 4 is an illustration of a front perspective view of an embodiment of an adjustable part holding fixture 10 of the disclosure that may be configured to be used with a robotic assembly 120. In one embodiment, the adjustable part holding system 100 (see FIG. 2A) and the adjustable part holding fixture 10 (see FIG. 2A) may be manual, in that the part holding assemblies 50 (see FIG. 2A) used in the adjustable part holding fixture 10 (see FIG. 2A) and in the adjustable part holding system 100 (see FIG. 2A) may be manually positioned and adjusted within the phase change material 20 (see FIG. 2A). In another embodiment, the adjustable part holding system 100 (see FIG. 5) and the adjustable part holding fixture 10 (see FIG. 4) may be automated, in that the part holding assemblies 50 (see FIG. 4) used in the adjustable part holding fixture 10 (see FIG. 4) and in the adjustable part holding system 100 (see FIG. 5) may be automatically positioned and adjusted within the phase change material 20 (see FIG. 2A) by using a robotic assembly 120 (see FIGS. 4, 5) that is automated.

As shown in FIG. 4, the adjustable part holding fixture 10 comprises the base assembly 16, such as in the form of base assembly 16a. The base assembly 16 (see FIG. 4) comprises the container 18 (see FIG. 4), such as the non-partitioned container 18a (see FIG. 4), and the phase change material 20 (see FIG. 4) contained within the container 18 (see FIG. 4). The flexible membrane 92 (see FIG. 4) is positioned over the phase change material 20 (see FIG. 4) in the container 18 (see FIG. 4). Alternatively, the partitioned container 18b (see FIG. 3B) may be used.

The adjustable part holding fixture 10 (see FIG. 4) further comprises the connection element 38 (see FIG. 4) connected to the phase change material 20 (see FIG. 4) through the container 18 (see FIG. 4) and connected from the control device 32 (see FIGS. 1A, 3A). The adjustable part holding fixture 10 (see FIG. 4) is positioned on top of the work surface 104 (see FIG. 4) of the machining assembly 102 (see FIG. 3A).

FIG. 4 shows the part holding assemblies 50 comprising the post members 58 of the base anchoring portions 52 (see FIG. 1A), and the part attachment portions 54 in the form of vacuum cups 82. As shown in FIG. 4, the post members 58 are partially inserted within the phase change material 20 in the container 18. Each vacuum cup 82 (see FIG. 4) is attached to vacuum tubing 84 (see FIG. 4) via fittings 83 (see FIG. 4).

As shown in FIG. 4, the robotic assembly 120 is configured to insert and position the part holding assemblies 50 in the phase change material 20, and in particular, is configured to insert and position the post members 58 of the part holding assemblies 50 partially within the phase change material 20 (or fully within the phase change material 20 with the embodiment shown in FIG. 3A). Further, the robotic assembly 120 (see FIG. 4) is configured to releasably attach the part attachment portion 54 (see FIG. 4) to the surface 80 (see FIG. 3A) of the part 12 (see FIG. 3A) being held.

In one embodiment, as shown in FIG. 4, the robotic assembly 120 may comprise a robotic indexing head 122 configured for contact with each part holding assembly 50, and in particular, with the part attachment portion 54 of each part holding assembly 50. The robotic assembly 120 (see FIG. 4) may further comprise a contour track 124 (see FIG. 4) which is configured to move the robotic indexing head 122 (see FIG. 4) in a downward direction $d_1$ (see FIG. 4) toward the part attachment portion 54 (see FIG. 4) and then in an upward direction $d_2$ (see FIG. 4) once the part attachment portion 54 (see FIG. 4) is positioned in the phase change material 20 (see FIG. 4).

Referring now to FIG. 5, FIG. 5 is an illustration of a functional block diagram showing an exemplary embodiment of an adjustable part holding system 100 of the disclosure. The adjustable part holding system 100 (see FIG. 5) is configured to hold the part 12 (see FIG. 5), such as the workpiece 12a (see FIG. 5) or an aircraft part 12b (see FIG. 5), during one or more processes 14 (see FIG. 5), such as one or more manufacturing processes 14a (see FIG. 5) performed on the part 12 (see FIG. 5).

As shown in FIG. 5, and discussed in further detail above, the adjustable part holding system 100 comprises the machining assembly 102 with the adjustable part holding fixture 10. As discussed above, and also shown in FIGS. 2A and 3A, the machining assembly 102 (see FIG. 5) has the work surface 104 (see FIG. 5) and the machine tool 106 (see FIG. 5). As shown in FIG. 5, the work surface 104 may comprise a work table 104a, a platform 104b, or another suitable work surface 104 on which the adjustable part holding fixture 10 may be set up, secured, and/or retained, and the machine tool 106, discussed in detail above, comprises the tool 108, such as a cutter 108a, a drill 108b, a trimmer 108c, or another suitable tool 108. The machine tool 106 (see FIG. 5) is preferably coupled to the control and power system 116 (see FIG. 5), discussed in detail above, that is configured for controlling and powering the machine tool 106 (see FIG. 5).

As further shown in FIG. 5, the machining assembly 102 may comprise a housing 110 surrounding the adjustable part holding fixture 10 and part 12 being held by the adjustable part holding fixture 10. The machining assembly 102 (see FIG. 5) may comprise the robotic assembly 120 (see FIG. 5) having the robotic indexing head 122 (see FIG. 5) and contour track 124 (see FIG. 5).

As shown in FIG. 5, the adjustable part holding fixture 10 comprises a plurality of part holding assemblies 50, the base assembly 16, and the control device 32. The part holding assemblies 50 (see FIG. 5) are configured to releasably attach to the surface 80 (see FIG. 5) of the part 12 (see FIG. 5) being held by the adjustable part holding fixture 10 (see FIG. 5) and are configured to hold and secure the part 12 (see FIG. 5) in place.

Each part holding assembly 50 (see FIG. 5) may be in the form of an adjustable actuator 51 (see FIG. 5). Each part holding assembly 50 (see FIG. 5) comprises a base anchoring portion 52 (see FIG. 5) and a part attachment portion 54 (see FIG. 5). The base anchoring portion 52 (see FIG. 5) preferably comprises one or more anchor members 56 (see FIG. 5) coupled to a post member 58 (see FIG. 5).

The part attachment portion 54 (see FIG. 5) is preferably in the form of one or more of a vacuum cup 82 (see FIG. 5), or suction cup, a clamping element 88 (see FIG. 5), an adhesive material 89 (see FIG. 5), or another suitable part attachment portion 54 (see FIG. 5). As discussed above, each vacuum cup 82 (see FIG. 5) is configured for attachment to the vacuum tubing 84 (see FIG. 3A) and may use a fitting 83 (see FIG. 2A). The vacuum tubing 84 (see FIG. 3A) supplies a vacuum or provides air pressure to the vacuum cups 82 (see FIG. 5) from the separate vacuum generator 85 (see FIG. 3A) or a pneumatic source. Alternatively, each vacuum cup 82 (see FIG. 5) may have an integrated vacuum generator (not shown) using pneumatic pressure to generate a vacuum.

The adjustable part holding fixture 10 (see FIG. 5) of the adjustable part holding system 100 (see FIG. 5) may further comprise a flexible membrane 92 (see FIG. 5), discussed in detail above, coupled between the base anchoring portions 52 (see FIG. 5) and the part attachment portions 54 (see FIG. 5) of the plurality of part holding assemblies 50 (see FIG. 5). The flexible membrane 92 (see FIG. 5) is preferably positioned over the phase change material 20 (see FIG. 5).

As shown in FIG. 5, the base assembly 16 comprises the container 18 containing the phase change material 20. The base anchoring portion 52 (see FIG. 5) is preferably fully or partially inserted into or embedded within the phase change material 20 (see FIG. 5) and configured to be held in place by the phase change material 20 (see FIG. 5), while the phase change material 20 (see FIG. 5) is in the rigid state 36 (see FIG. 5). Each base anchoring portion 52 (see FIG. 5) in the phase change material 20 (see FIG. 5) is adjusted to the part 12 (see FIG. 5) being held, until a desired position 90 (see FIG. 5) of each base anchoring portion 52 (see FIG. 5) is obtained.

As shown in FIG. 5, the phase change material 20 may comprise a chemical-based phase change material (PCM) 20a or a physical-based phase change material (PCM) 20b. The phase change material 20 (see FIG. 5) is preferably a material capable of storing and releasing thermal energy 21 (see FIG. 5).

The phase change material 20 (see FIG. 5), such as the chemical-based phase change material (PCM) 20a (see FIG. 5), preferably comprises one or more of the following: magnetorheological materials 20c (see FIG. 5), electrorheological materials 20d (see FIG. 5), inorganic materials such as salt hydrate materials 20e (see FIG. 5), organic materials such as paraffin materials 20f (see FIG. 5) and polyglycol materials 20g (see FIG. 5), eutectic materials 20h (see FIG. 5), shape memory alloys 20i (see FIG. 5), a combination thereof, or another suitable chemical-based phase change material 20 (see FIG. 5). The phase change material 20 (see FIG. 5), such as the physical-based phase change material (PCM) 20b (see FIG. 5), preferably comprises compressed air freeze material 20j (see FIG. 5), rubber gripper with granular material 20k, such as sand material, (see FIG. 5), or another suitable physical-based phase change material 20 (see FIG. 5).

As shown in FIG. 5, the control device 32, such as in the form of electric phase controller 32a, is coupled to the phase change material 20 in the container 18. The control device 32 (see FIG. 5) is configured to convert the phase change material 20 (see FIG. 5) between the non-rigid state 34 (see FIG. 5) and the rigid state 36 (see FIG. 5). The non-rigid state 34 (see FIG. 5) may comprise a liquid form 34a (see FIG. 5), a flexible form 34b (see FIG. 5), or another suitable non-rigid state 34 (see FIG. 5) or form. The rigid state 36 (see FIG. 5) may comprise a solid form 36a (see FIG. 5) or another suitable rigid state 36 (see FIG. 5) or form. The control device 32 (see FIG. 5) has one or more connection elements 38 (see FIG. 5), such as wired elements 38a (see FIG. 5) or wireless elements 38b (see FIG. 5), connected to the phase change material 20 in the container 18.

Figure 6:
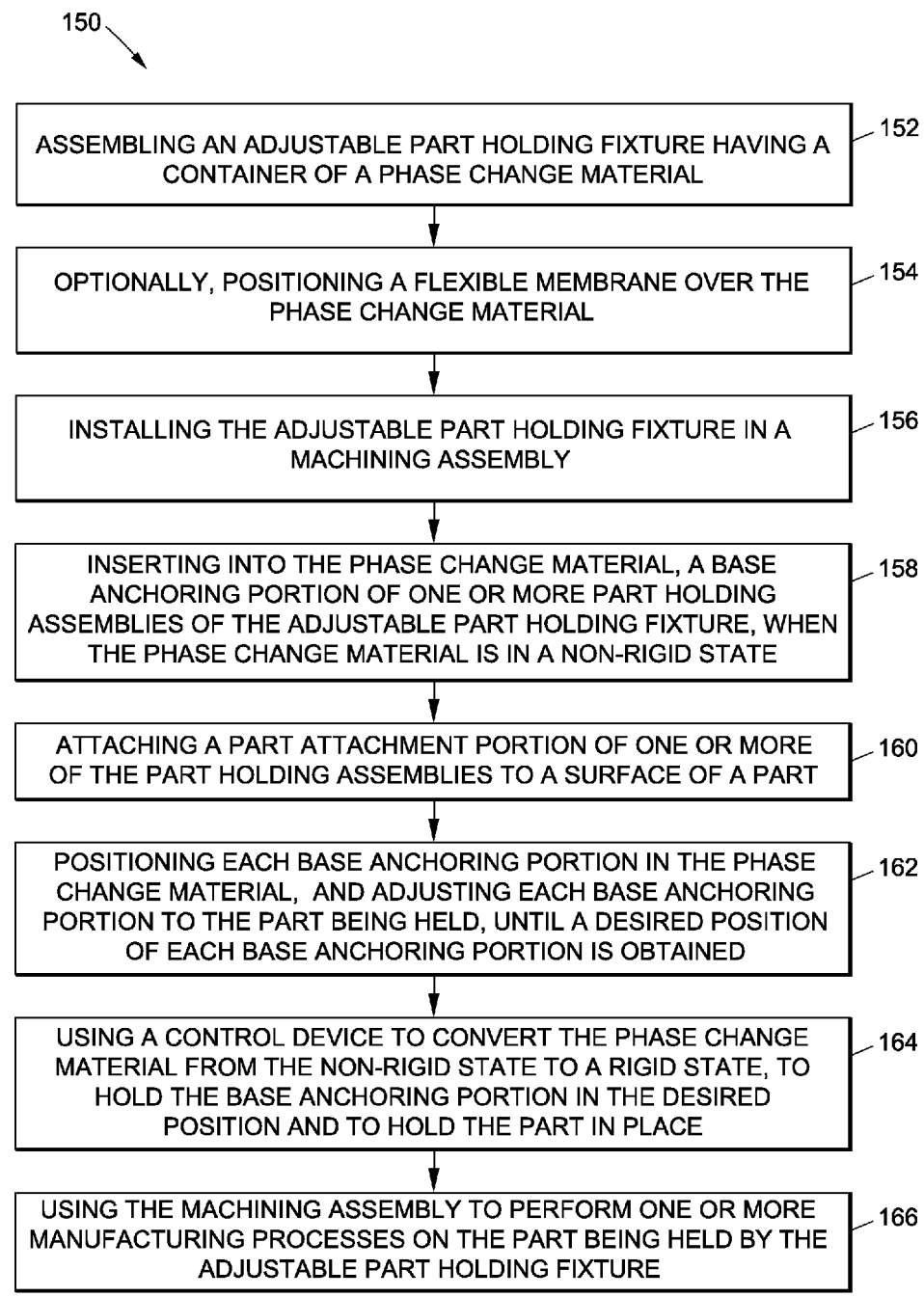
FIG. 6 is an illustration of a block flow diagram showing an exemplary embodiment of an adjustable part holding method of the disclosure.

Referring now to FIG. 6, in another embodiment there is provided an adjustable part holding method 150 for holding a part 12 (see FIG. 2A) during one or more processes 14 (see FIG. 5), such as one or more manufacturing processes 14a (see FIG. 5), performed on the part 12 (see FIG. 2A). FIG. 6 is an illustration of a block flow diagram showing an exemplary embodiment of the adjustable part holding method 150 of the disclosure.

As shown in FIG. 6, the adjustable part holding method 150 comprises step 152 of assembling an adjustable part holding fixture 10 (see FIGS. 1A, 2A). The adjustable part holding fixture 10 (see FIGS. 1A, 2A) comprises a base assembly 16 (see FIGS. 1A, 2A)) having a container 18 (see FIGS. 1A, 2A) of a phase change material 20 (see FIGS. 1A, 2A), discussed in detail above, contained within the container 18 (see FIGS. 1A, 2A). The adjustable part holding fixture 10 (see FIGS. 1A, 2A) further comprises a control device 32 (see FIGS. 1A, 2A), discussed in detail above, coupled to the phase change material 20 (see FIGS. 1A, 2A). The control device 32 (see FIGS. 1A, 2A) is preferably in the form of an electronic phase controller 32a (see FIGS. 1A, 2A). The adjustable part holding fixture 10 (see FIGS. 1A, 2A) further comprises a plurality of part holding assemblies 50 (see FIGS. 1A, 2A), discussed in detail above. Each part holding assembly 50 (see FIGS. 1A, 2A) comprises the base anchoring portion 52 (see FIGS. 1A, 2A) coupled to the part attachment portion 54 (see FIGS. 1A, 2A).

As shown in FIG. 6, the adjustable part holding method 150 comprises optional step 154 of positioning a flexible membrane 92 (see FIGS. 1A, 3A) over the phase change material 20 (see FIGS. 1A, 3A), preferably between the base anchoring portions 52 (see FIGS. 1A, 3A) and the part attachment portions 54 (see FIGS. 1A, 3A) of the plurality of part holding assemblies 50 (see FIGS. 1A, 3A).

As shown in FIG. 6, the adjustable part holding method 150 further comprises step 156 of installing the adjustable part holding fixture 10 (see FIGS. 1A, 2A, 3A) in the machining assembly 102 (see FIGS. 2A, 3A), discussed in detail above. The machining assembly 102 (see FIGS. 2A, 3A) comprises at least a work surface 104 (see FIGS. 2A, 3A) and a machine tool 106 (see FIGS. 2A, 3A) coupled to a control and power system 116 (see FIGS. 2A, 3A). As shown in FIG. 6, the adjustable part holding method 150 further comprises step 158 of inserting into the phase change material 20 (see FIGS. 1A, 2A, 3A), the base anchoring portion 52 (see FIGS. 1A, 2A, 3A) of one or more of the part holding assemblies 50 (see FIGS. 1A, 2A, 3A) of the adjustable part holding fixture 10 (see FIGS. 1A, 2A, 3A), when the phase change material 20 (see FIGS. 1A, 2A, 3A) is in a non-rigid state 34 (see FIG. 5).

As shown in FIG. 6, the adjustable part holding method 150 further comprises step 160 of attaching the part attachment portion 54 (see FIGS. 2A, 3A) of one or more of the part holding assemblies 50 (see FIGS. 2A, 3A) to a surface 80 (see FIGS. 2A, 3A) of the part 12 (see FIGS. 2A, 3A). As shown in FIG. 6, the adjustable part holding method 150 further comprises step 162 of positioning each base anchoring portion 52 (see FIGS. 2A, 3A) in the phase change material 20 (see FIGS. 2A, 3A), and adjusting each base anchoring portion 52 (see FIGS. 2A, 3A) to the part 12 (see FIGS. 2A, 3A) being held, until a desired position 90 (see FIG. 5) of each base anchoring portion 52 (see FIGS. 2A, 3A) is obtained.

As shown in FIG. 6, the adjustable part holding method 150 further comprises step 164 of using the control device 32 (see FIGS. 1A, 2A, 3A) to convert the phase change material 20 (see FIGS. 1A, 2A, 3A) from the non-rigid state 34 (see FIG. 5) to a rigid state 36 (see FIG. 5) to hold the base anchoring portion 52 (see FIGS. 1A, 2A, 3A) in the desired position 90 (see FIG. 5) and to hold the part 12 (see FIGS. 2A, 3A) in place. As shown in FIG. 6, the adjustable part holding method 150 further comprises step 166 of using the machining assembly 102 (see FIGS. 2A, 3A) to perform one or more processes 14 (see FIG. 5), such as one or more manufacturing processes 14a (see FIG. 5), on the part 12 (see FIGS. 2A, 3A) being held by the adjustable part holding fixture 10 (see FIGS. 2A, 3A).

In one embodiment, the adjustable part holding method 150 (see FIG. 6) may be manual. In another embodiment, the adjustable part holding method 150 (see FIG. 6) is automated and comprises the step of contacting the adjustable part holding fixture 10 (see FIG. 4) with a robotic assembly 120 (see FIGS. 4, 5). The robotic assembly 120 (see FIGS. 4, 5) preferably inserts and positions the part holding assemblies 50 (see FIG. 4) within the phase change material 20 (see FIG. 4), and in particular, inserts and positions the post members 58 (see FIG. 4) of the base anchoring portions 52 (see FIG. 3A) within the phase change material 20 (see FIG. 4), and attaches the part attachment portions 54 (see FIG. 4) to the surface 80 (see FIG. 3A) of the part 12 (see FIG. 3A).

In one embodiment, the assembling step 152 may comprise assembling the adjustable part holding fixture 10 (see FIG. 2B) with the base assembly 16 (see FIG. 2B) comprising a partitioned container 18b (see FIGS. 2B, 3B) having two or more separate compartments 28 (see FIGS. 2B, 3B) configured to separately hold the base anchoring portion 52 (see FIGS. 2B, 3B) of each part holding assembly 50 (see FIGS. 2B, 3B) in the phase change material 20 (see FIGS. 2B, 3B). When the container 18 (see FIGS. 2B, 3B) has two or more separate compartments 28 (see FIGS. 2B, 3B), the steps of the method 150 (see FIG. 6), including the step 158 (see FIG. 6) of inserting the base anchoring portion 52 (see FIGS. 2B, 3B), the step 160 (see FIG. 6) of attaching the part attachment portion 54 (see FIGS. 2B, 3B), the step 162 (see FIG. 6) of positioning each base anchoring portion 52 (see FIGS. 2B, 3B), and the step 164 (see FIG. 6) of using the control device 32 (see FIGS. 2A, 3A) are performed with each separate compartment 28 (see FIGS. 2B, 3B) of the partitioned container 18b (see FIGS. 2B, 3B), before the step 166 (see FIG. 6) of using the machining assembly 102 (see FIGS. 2A, 3A) to perform the one or more processes 14 (see FIG. 5), such as one or more manufacturing processes 14a (see FIG. 5), on the part 12 (see FIGS. 2B, 3B) being held by the adjustable part holding fixture 10 (see FIGS. 2B, 3B).

Figure 7:
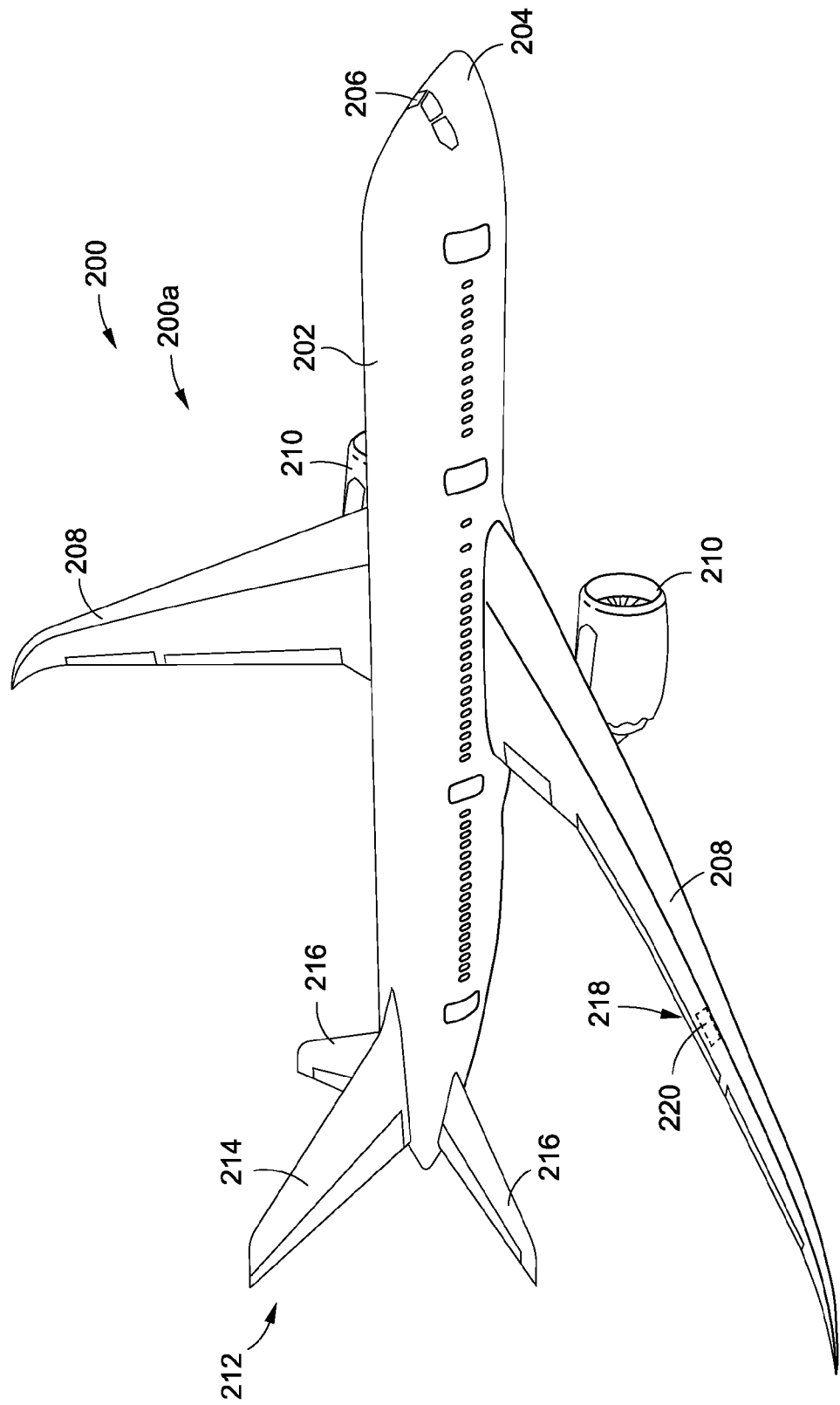
FIG. 7 is an illustration of a perspective view of an aircraft that may incorporate one or more structures that may be manufactured using embodiments of an adjustable part holding system and an adjustable part holding method of the disclosure.

FIG. 7 is an illustration of a perspective view of an air vehicle 200, such as an aircraft 200a, that includes one or more structures 218, such as, for example, a wing skin part 220, that may be manufactured or processed using embodiments of the adjustable part holding system 100 (see FIGS. 2A, 3A, 4, 5) with the adjustable part holding fixture 10 (see FIGS. 2A, 3A, 4, 5), and the adjustable part holding method 150 (see FIG. 6) of the disclosure. As shown in FIG. 7, the aircraft 200a comprises such components as a fuselage 202, a nose 204, a flight deck 206, wings 208, one or more propulsion units 210, and a tail 212 comprising a vertical tail portion 214 and horizontal tail portions 216.

Although the aircraft 200a shown in FIG. 7 is generally representative of a commercial passenger aircraft having one or more structures 218, the teachings of the disclosed embodiments may be applied to other passenger aircraft. For example, the teachings of the disclosed embodiments may be applied to cargo aircraft, military aircraft, rotorcraft, and other types of aircraft or aerial vehicles, as well as aerospace vehicles, satellites, space launch vehicles, rockets, and other aerospace vehicles.

Figure 8:
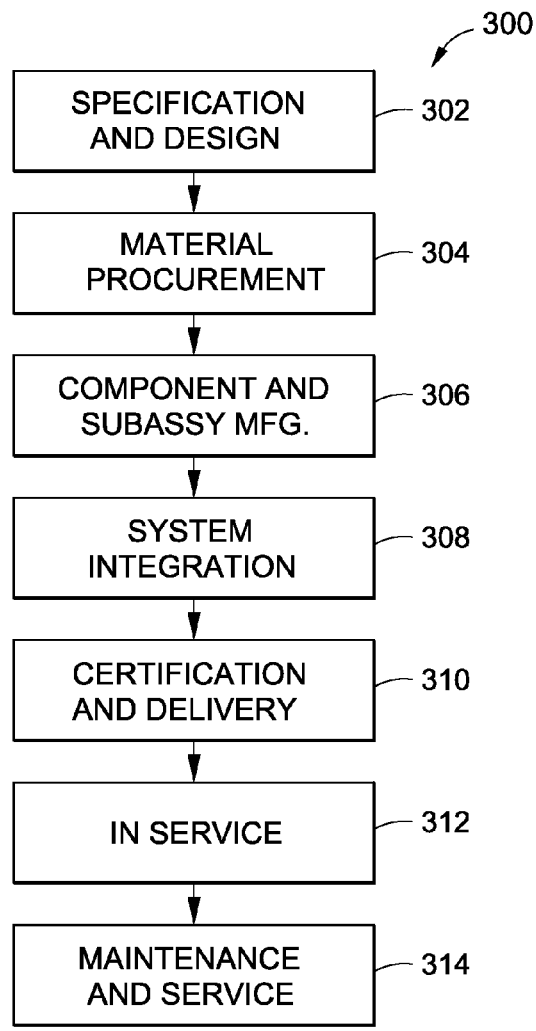
FIG. 8 is an illustration of a flow diagram of an aircraft manufacturing and service method; and, FIG. 9 is an illustration of a block diagram of an aircraft.
Figure 9:
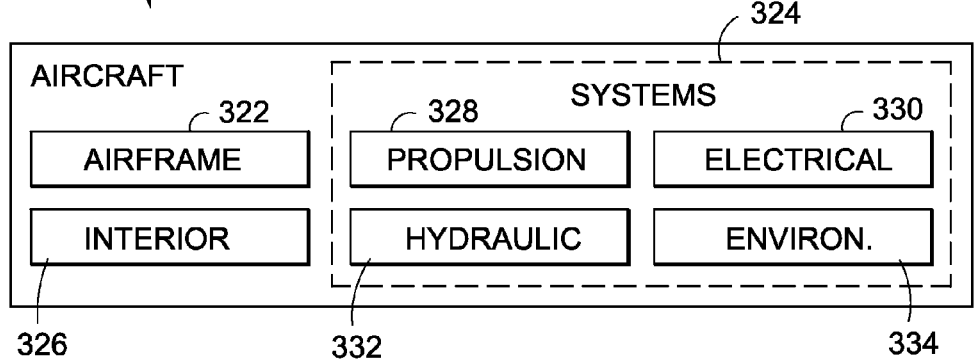

FIG. 8 is an illustration of a flow diagram of an aircraft manufacturing and service method 300. FIG. 9 is an illustration of a block diagram of an aircraft 320. Referring to FIGS. 8-9, embodiments of the disclosure may be described in the context of the aircraft manufacturing and service method 300 as shown in FIG. 8, and the aircraft 320 as shown in FIG. 9.

During pre-production, exemplary aircraft manufacturing and service method 300 may include specification and design 302 of the aircraft 320 and material procurement 304. During manufacturing, component and subassembly manufacturing 306 and system integration 308 of the aircraft 320 takes place. Thereafter, the aircraft 320 may go through certification and delivery 310 in order to be placed in service 312. While in service 312 by a customer, the aircraft 320 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 9, the aircraft 320 produced by the exemplary aircraft manufacturing and service method 300 may include an airframe 322 with a plurality of systems 324 and an interior 326. Examples of the plurality of systems 324 may include one or more of a propulsion system 328, an electrical system 330, a hydraulic system 332, and an environmental system 334. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 320 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 320. Similarly, one or more of apparatus embodiments, method embodiments, or a combination thereof, may be utilized while the aircraft 320 is in service 312, for example and without limitation, to maintenance and service 314.

Disclosed embodiments of the adjustable part holding fixture 10 (see FIGS. 1A, 2A, 3A, 5), the adjustable part holding system 100 (see FIGS. 2A, 3A, 5), and the adjustable part holding method 150 (see FIG. 6) provide an adjustable part holding fixture 10 (see FIGS. 1A, 2A, 3A, 5) that can be easily reconfigured based on the actual shape of the part 12 (see FIGS. 2A, 3A) being held and will also hold the part 12 (see FIGS. 2A, 3A) rigidly during trimming, drilling or other processes 14 (see FIG. 5), such as manufacturing processes 14a (see FIG. 5) that apply forces or require the part 12 (see FIGS. 2A, 3A) to be held securely. The adjustable part holding fixture 10 (see FIGS. 1A, 2A, 3A, 5) comprises a base assembly 16 (see FIG. 5) and a plurality of part holding assemblies 50 (see FIG. 5). The base assembly 16 (see FIG. 5) comprises a container 18 (see FIG. 5) containing a phase change material 20 (see FIG. 5) that can alter its physical properties between two states: a non-rigid state 34 (see FIG. 5), or flexible state, which allows the phase change material 20 (see FIG. 5) to adapt to the part 12 (see FIG. 5) being held and a rigid state 36 (see FIG. 5) which maintains the shape of the part 12 (see FIG. 5) during processing or manufacturing.

The phase change material 20 (see FIG. 5) provides a means of controlling whether the plurality of part holding assemblies 50 (see FIG. 5), such as in the form of adjustable actuators 51 (see FIG. 5) are held rigidly or are allowed to easily be moved to adapt to a different part 12 (see FIG. 5). The phase change material 20 (see FIG. 5) can have a chemical or physical-based phase changing mechanism. The plurality of part holding assemblies 50 (see FIG. 5) are inserted into the phase change material 20 (see FIG. 5). Optionally, a flexible membrane 92 (see FIG. 5) may be positioned over phase change material 20 (see FIG. 5).

The part 12 (see FIG. 5) can be held to the adjustable part holding fixture 10 (see FIGS. 1A, 2A, 3A, 5) via the part attachment portion 54 (see FIG. 5) of each part holding assembly 50 (see FIG. 5), such as vacuum cups 82 (see FIG. 5), clamping elements 88 (see FIG. 5), adhesive material 89 (see FIG. 5), or other suitable part attachment portions 54 (see FIG. 5). The control device 32 (see FIG. 5), such as in the form of electric phase controller 32a (see FIG. 5) may be used to switch or convert the phase change material 20 (see FIG. 5) between the rigid state 36 (see FIG. 5) and the non-rigid state 34 (see FIG. 5). When the phase change material 20 (see FIG. 5) is in the non-rigid state 34 (see FIG. 5), the part attachment portion 54 (see FIG. 5) can adapt to the shape of the part 12 (see FIGS. 2A, 3A). When the desired shape is attained, the phase change material 20 (see FIG. 5) is switched to its rigid state 36 (see FIG. 5) and the part attachment portions 54 (see FIG. 5) hold the part 12 (see FIG. 5) steady and securely. Portability and simplicity of set up allows the adjustable part holding fixture 10 (see FIGS. 1A, 2A, 3A, 5) fixture to be easily moved to a remote location for use in maintenance, repair, and other facilities, or for use on aircraft on the ground.

In addition, disclosed embodiments of the adjustable part holding fixture 10 (see FIGS. 1A, 2A, 3A, 5), the adjustable part holding system 100 (see FIGS. 2A, 3A, 5), and the adjustable part holding method 150 (see FIG. 6) provide, as compared to known solid fixtures, a fixture, system, and method that is adaptable to part variation and does not require additional fixtures for each part shape, may not require additional storage space, and minimizes or eliminates design and manufacturing costs associated with known solid fixtures. The adjustable part holding fixture 10 (see FIGS. 1A, 2A, 3A, 5) is rapidly reconfigurable, is highly adjustable, and is simple to assemble, install, set up, use and service, is reliable, and may result in flow time savings due to no need to change out solid fixtures.

Moreover, disclosed embodiments of the adjustable part holding fixture 10 (see FIGS. 1A, 2A, 3A, 5), the adjustable part holding system 100 (see FIGS. 2A, 3A, 5), and the adjustable part holding method 150 (see FIG. 6) provide, as compared to known flexible fixtures, a fixture, system, and method that has a compact design due to lack of a motorized actuator and thus requires less floor space, does not require a large number of motors and brakes and thus is less complex and may result in decreased maintenance and repair costs, and does not require a sophisticated controller to drive actuators to programmed positions, and thus, may result in decreased manufacturing costs, decreased maintenance costs due to simplicity, and decreased storage costs. Further, disclosed embodiments of the adjustable part holding fixture 10 (see FIGS. 1A, 2A, 3A, 5), the adjustable part holding system 100 (see FIGS. 2A, 3A, 5), and the adjustable part holding method 150 (see FIG. 6) provide, as compared to known flexible fixtures, a fixture, system, and method that adjusts to part variation mechanically without complex motor control schemes and programming, has a portable design that can be taken to remote sites, has a lower maintenance due to simplicity, has a lower cost than known flexible fixturing devices, In addition, disclosed embodiments of the adjustable part holding fixture 10 (see FIGS. 1A, 2A, 3A, 5), the adjustable part holding system 100 (see FIGS. 2A, 3A, 5), and the adjustable part holding method 150 (see FIG. 6) provide a fixture, system, and method that allows for the physical controlled reconfigurable base anchored part fixturing of a part supportive post or pogo matrix in a predetermined manner. Adaptive base fixture anchoring allows for adaptive supportive fixturing of part holding assemblies 50 (see FIG. 5) or an associated supportive pogo device or similar in the location of a part 12 (see FIG. 5), structure 218 (see FIG. 7), or structural assembly for manufacturing processes 14a (see FIG. 5), such as machining, or assembly operations. In function, the phase change material 20 (see FIG. 5) is capable of altering through the control device 32 (see FIG. 5) a change in physical state between a rigid state 36 (see FIG. 5) or solid form 36a (see FIG. 5), and a non-rigid state 34 (see FIG. 5) or flexible form 34b (see FIG. 5), to permit the repositioning of the part attachment portions 54 (see FIG. 5), such as one or more of vacuum cups 82 (see FIG. 5), clamping elements 88 (see FIG. 5), adhesive materials 89 (see FIG. 5) or other suitable part attachment portions 54 (see FIG. 5) or anchoring support tooling into a new location within the phase change material 20 (see FIG. 5).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An adjustable part holding fixture comprising:
   a base assembly comprising a container and a phase change material contained within the container;
   a control device coupled to the phase change material and configured to convert the phase change material between a non-rigid state and a rigid state; and
   a plurality of separate part holding assemblies, each part holding assembly comprising a base anchoring portion coupled to a part attachment portion, each base anchoring portion inserted into and positioned in the phase change material in the container, and each part attachment portion configured to releasably attach to a surface of a part being held by the plurality of separate part holding assemblies of the adjustable part holding fixture, each of the plurality of separate part holding assemblies being independently repositionable based on a shape of the part,
   wherein the phase change material in the non-rigid state allows for positioning of each base anchoring portion in the container and adjusting to the part being held, and further wherein the phase change material in the rigid state holds each base anchoring portion in a desired position in the container and holds the part in place to each part attachment portion during one or more processes performed on the part.

2. The fixture of claim 1 wherein the container of the base assembly is a partitioned container comprising two or more separate compartments configured to separately hold the base anchoring portion of each part holding assembly partially or fully in the phase change material.

3. The fixture of claim 1 wherein the phase change material comprises a chemical-based phase change material or a physical-based phase change material.

4. The fixture of claim 1 wherein the phase change material is a material capable of storing and releasing thermal energy, and comprises one or more of magnetorheological materials, electrorheological materials, salt hydrate materials, paraffin materials, polyglycol materials, eutectic materials, shape memory alloys, compressed air freeze material, and rubber gripper with granular material.

5. The fixture of claim 1 wherein the control device is coupled to the phase change material via one or more connection elements, and the control device comprises an electric phase controller configured to convert the phase change material between the non-rigid state and the rigid state.

6. The fixture of claim 1 further comprising a flexible membrane coupled between the base anchoring portions and the part attachment portions of the plurality of part holding assemblies, the flexible membrane having a plurality of openings, each opening being of a sufficient size to accommodate insertion of a post member of each of the plurality of separate part holding assemblies through each respective opening.

7. The fixture of claim 1 wherein each base anchoring portion comprises one or more anchor members connected to a post member, and further wherein each anchor member has one or more flange elements to facilitate retention of each base anchoring portion in the phase change material, when the rigid state is activated by the control device.

8. The fixture of claim 1 wherein each part attachment portion comprises one or more of a vacuum cup, a clamping element, and an adhesive material.

9. The fixture of claim 8 wherein the part attachment portion comprises the vacuum cup, and the vacuum cup is attached to a vacuum generator via a vacuum tubing.

10. The fixture of claim 1 wherein the adjustable part holding fixture is automated and configured to be used with a robotic assembly that inserts and positions the plurality of part holding assemblies in the phase change material, and that releasably attaches the part attachment portions of the plurality of part holding assemblies to the surface of the part being held.

11. An adjustable part holding system comprising:
   a machining assembly comprising at least a work surface and a machine tool, the machine tool coupled to a control and power system configured for controlling and powering the machine tool; and
   a portable, adjustable part holding fixture installed in the machining assembly, the adjustable part holding fixture comprising:
      a base assembly comprising a container and a phase change material contained within the container;

a control device coupled to the phase change material and configured to convert the phase change material between a non-rigid state and a rigid state;

a plurality of separate part holding assemblies, each part holding assembly comprising a base anchoring portion coupled to a part attachment portion, each base anchoring portion inserted into and positioned in the phase change material in the container, and each part attachment portion configured to releasably attach to a surface of a part being held by the plurality of separate part holding assemblies of the adjustable part holding fixture, each of the plurality of separate part holding assemblies being independently repositionable based on a shape of the part; and a flexible membrane coupled between each base anchoring portion and each part attachment portion of the plurality of separate part holding assemblies, the flexible membrane having a plurality of openings, each opening being of a sufficient size to accommodate insertion of a post member of each of the plurality of separate part holding assemblies through each respective opening, wherein the phase change material in the non-rigid state allows for positioning of each base anchoring portion in the container and adjusting to the part being held, and further wherein the phase change material in the rigid state holds each base anchoring portion in a desired position in the container and holds the part in place to each part attachment portion during one or more manufacturing processes performed on the part.

12. The system of claim 11 wherein the adjustable part holding system is automated and configured to be used with a robotic assembly in contact with the adjustable part holding fixture, the robotic assembly configured to insert and position the plurality of part holding assemblies in the phase change material, and configured to releasably attach the part attachment portions of the plurality of part holding assemblies to the surface of the part being held.

13. The system of claim 11 wherein the phase change material is a material capable of storing and releasing thermal energy, and comprises one or more of magnetorheological materials, electrorheological materials, salt hydrate materials, paraffin materials, polyglycol materials, eutectic materials, shape memory alloys, compressed air freeze material, and rubber gripper with granular material.

14. The system of claim 11 wherein the part attachment portion comprises one or more of a vacuum cup, a clamping element, and an adhesive material.

15. The system of claim 11 wherein the part is an aircraft part, and the one or more manufacturing processes comprise one or more of machining, milling, cutting, drilling, trimming, shaping, turning, boring, grinding, and planing.

16. An adjustable part holding method for holding a part during one or more manufacturing processes performed on the part, the adjustable part holding method comprising the steps of:

assembling an adjustable part holding fixture comprising:
a base assembly having a container and a phase change material contained within the container;
a control device coupled to the phase change material; and
a plurality of separate part holding assemblies, each part holding assembly comprising a base anchoring portion coupled to a part attachment portion;

installing the adjustable part holding fixture in a machining assembly, the machining assembly comprising at least a work surface and a machine tool coupled to a control and power system;

inserting into the phase change material in the container, the base anchoring portion of each of the plurality of separate part holding assemblies, when the phase change material is in a non-rigid state;

releasably attaching the part attachment portion of each of the plurality of separate part holding assemblies to a surface of the part, each of the plurality of separate part holding assemblies being independently repositionable based on a shape of the part;

positioning each base anchoring portion in the phase change material, and adjusting each base anchoring portion to the part being held, until a desired position of each base anchoring portion is obtained;

using the control device to convert the phase change material from the non-rigid state to a rigid state, to hold the base anchoring portion in the desired position and to hold the part in place; and using the machining assembly to perform one or more manufacturing processes on the part being held by the adjustable part holding fixture.

17. The method of claim 16 further comprising after the assembling step, the step of positioning a flexible membrane over the phase change material, between the base anchoring portion and the part attachment portion of each of the part holding assemblies.

18. The method of claim 16 wherein the adjustable part holding method is automated and comprises the step of contacting the adjustable part holding fixture with a robotic assembly, the robotic assembly configured to insert and position the plurality of part holding assemblies in the phase change material, and configured to attach the part attachment portions of the plurality of part holding assemblies to the surface of the part.

19. The method of claim 16 wherein the assembling step comprises assembling the adjustable part holding fixture with the base assembly comprising a partitioned container having two or more separate compartments configured to separately hold the base anchoring portion of each part holding assembly in the phase change material, and further wherein the steps of inserting the base anchoring portion, attaching the part attachment portion, positioning each base anchoring portion, and using the control device are performed with each separate compartment of the partitioned container, before the step of using the machining assembly to perform the one or more manufacturing processes on the part being held by the adjustable part holding fixture.

* * * * *